(12) United States Patent
Daredia et al.

(10) Patent No.: US 12,712,755 B2
(45) Date of Patent: Aug. 18, 2026

(54) GENERATING CUSTOMIZED MEETING INSIGHTS BASED ON USER INTERACTIONS AND MEETING MEDIA

(71) Applicant: Dropbox, Inc., San Francisco, CA (US)

(72) Inventors: Shehzad Daredia, San Francisco, CA (US); Behrooz Khorashadi, Mountain View, CA (US)

(73) Assignee: Dropbox, Inc., San Francisco, CA (US)

( * ) Notice: Subject to any disclaimer, the term of this patent is extended or adjusted under 35 U.S.C. 154(b) by 118 days.

(21) Appl. No.: 18/770,400

(22) Filed: Jul. 11, 2024

(65) Prior Publication Data

US 2024/0364553 A1 Oct. 31, 2024

Related U.S. Application Data

(63) Continuation of application No. 18/316,040, filed on May 11, 2023, now Pat. No. 12,040,908, which is a (Continued)

(51) Int. Cl.

*H04L 12/18* (2006.01)
*G06F 16/34* (2025.01)

(Continued)

(52) U.S. Cl.

CPC ........ *H04L 12/1831* (2013.01); *G06F 16/345* (2019.01); *G06N 20/00* (2019.01);

(Continued)

(58) Field of Classification Search

CPC ............ H04L 12/1831; H04L 12/1818; H04L 12/1822; G06F 16/345; G06N 20/00; G10L 15/083; G10L 2015/088

See application file for complete search history.

(56) References Cited

U.S. PATENT DOCUMENTS

| | | | |
|---|---|---|---|
| 5,384,703 | A | 1/1995 | Withgott et al. |
| 5,664,227 | A | 9/1997 | Mauldin et al. |

(Continued)

FOREIGN PATENT DOCUMENTS

| | | | |
|---|---|---|---|
| EP | 0899952 | A2 | 3/1999 |
| EP | 2677743 | A1 | 12/2013 |

OTHER PUBLICATIONS

Final Office Action from U.S. Appl. No. 16/587,424 mailed Nov. 21, 2024, 55 pages.

(Continued)

*Primary Examiner* — Bryan Y Lee
(74) *Attorney, Agent, or Firm* — Keller Preece PLLC

(57) ABSTRACT

Methods, systems, and non-transitory computer readable storage media are disclosed for generating meeting insights based on media data and device input data. In one or more embodiments, the system analyzes media data and inputs to client devices associated with a meeting to determine a portion of the meeting that is relevant for a user. In one or more embodiments, the system generates a meeting summary, meeting highlights, or action items related to the media data to provide to the client device. In one or more embodiments, the system also uses the summary, highlights, or action items to train a machine-learning model for use with future meetings.

20 Claims, 12 Drawing Sheets

Related U.S. Application Data continuation of application No. 16/587,408, filed on Sep. 30, 2019, now Pat. No. 11,689,379.

(60) Provisional application No. 62/865,614, filed on Jun. 24, 2019.

(51) Int. Cl.
*G06N 20/00* (2019.01)
*G10L 15/08* (2006.01)

(52) U.S. Cl.
CPC ........ *G10L 15/083* (2013.01); *H04L 12/1818* (2013.01); *H04L 12/1822* (2013.01); *G10L 2015/088* (2013.01)

(56) References Cited

U.S. PATENT DOCUMENTS 5,884,258 A 3/1999 Rozak et al.
6,289,304 B1 9/2001 Grefenstette
6,298,326 B1 10/2001 Feller
6,415,258 B1 7/2002 Reynar et al.
6,473,778 B1 10/2002 Gibbon
6,789,228 B1 9/2004 Merril et al.
6,795,806 B1 9/2004 Lewis et al.
7,280,738 B2 10/2007 Kauffman et al.
7,458,013 B2 11/2008 Fruchter et al.
8,095,120 B1 1/2012 Blair et al.
8,447,608 B1 5/2013 Chang et al.
8,670,977 B2 3/2014 Saraclar et al.
8,712,776 B2 4/2014 Bellegarda et al.
8,745,501 B2 6/2014 Krantz et al.
8,792,863 B2 7/2014 De Oliveira et al.
8,862,467 B1 10/2014 Casado et al.
9,251,532 B2 2/2016 Ho et al.
9,275,635 B1 3/2016 Beaufays et al.
9,324,323 B1 4/2016 Bikel et al.
9,560,152 B1 1/2017 Jamdar et al.
9,641,563 B1 5/2017 Kitada et al.
9,672,827 B1 6/2017 Jheeta
9,754,320 B2 9/2017 Calman et al.
9,785,707 B2 10/2017 Bayer et al.
9,875,225 B1 1/2018 Grueneberg et al.
9,977,779 B2 5/2018 Winer
10,129,392 B1 11/2018 Hodge
10,229,148 B1 3/2019 Nguyen et al.
10,248,626 B1 4/2019 Zhang et al.
10,275,444 B2 4/2019 Bogdan et al.
10,382,370 B1 8/2019 Labarre et al.
2002/0103864 A1 8/2002 Rodman et al.
2002/0107853 A1 8/2002 Hofmann et al.
2002/0111968 A1 8/2002 Ching
2002/0116291 A1 8/2002 Grasso et al.
2003/0158724 A1 8/2003 Uchida
2004/0111467 A1 6/2004 Willis
2004/0250201 A1 12/2004 Caspi
2005/0039114 A1 2/2005 Naimat et al.
2005/0076328 A1 4/2005 Berenbach et al.
2005/0125246 A1 6/2005 Muller et al.
2005/0144179 A1 6/2005 Maruhashi et al.
2006/0074656 A1 4/2006 Mathias et al.
2006/0167994 A1 7/2006 Chen et al.
2007/0078930 A1 4/2007 Ludwig et al.
2007/0116225 A1 5/2007 Zhao et al.
2007/0153989 A1 7/2007 Howell et al.
2007/0240060 A1 10/2007 Berenbach et al.
2007/0260968 A1 11/2007 Howard et al.
2007/0299665 A1 12/2007 Koll et al.
2008/0059152 A1 3/2008 Fridman et al.
2008/0086305 A1 4/2008 Lewis et al.
2008/0120101 A1 5/2008 Johnson et al.
2008/0228479 A1 9/2008 Prado
2009/0048845 A1 2/2009 Burckart et al.
2009/0083256 A1 3/2009 Thompson et al.
2009/0144051 A1 6/2009 Lee et al.
2009/0150827 A1 6/2009 Meyer et al.
2009/0177469 A1 7/2009 Findlay
2009/0177511 A1 7/2009 Shaw et al.
2009/0260060 A1 10/2009 Smith et al.
2009/0271438 A1 10/2009 Agapi et al.
2009/0307213 A1 12/2009 Deng et al.
2010/0095198 A1 4/2010 Bultrowicz et al.
2010/0158213 A1 6/2010 Mikan et al.
2010/0241512 A1 9/2010 Tirpak et al.
2010/0246784 A1 9/2010 Frazier et al.
2010/0284310 A1 11/2010 Shaffer et al.
2011/0013756 A1 1/2011 Davies et al.
2011/0043602 A1 2/2011 Lee
2011/0099006 A1 4/2011 Sundararaman et al.
2011/0167357 A1 7/2011 Benjamin et al.
2011/0268263 A1 11/2011 Jones et al.
2011/0271205 A1 11/2011 Jones et al.
2011/0296374 A1 12/2011 Wu et al.
2011/0320958 A1 12/2011 Kashi
2012/0030272 A1 2/2012 Bristow et al.
2012/0069134 A1 3/2012 Garcia, Jr. et al.
2012/0128146 A1 5/2012 Boss et al.
2012/0131060 A1 5/2012 Heidasch
2012/0166924 A1 6/2012 Larson et al.
2012/0254318 A1 10/2012 Poniatowskl
2012/0284640 A1 11/2012 Sloyer et al.
2012/0311090 A1 12/2012 Locker et al.
2012/0323572 A1 12/2012 Koll et al.
2012/0323575 A1 12/2012 Gibbon et al.
2013/0055076 A1 2/2013 Assadollahi
2013/0058471 A1 3/2013 Garcia
2013/0144603 A1 6/2013 Lord et al.
2013/0151233 A1 6/2013 Gande et al.
2014/0009677 A1 1/2014 Homyack et al.
2014/0063177 A1 3/2014 Tian et al.
2014/0108544 A1 4/2014 Lewis et al.
2014/0157150 A1 6/2014 Durvasula et al.
2014/0163977 A1 6/2014 Hoffmeister et al.
2014/0244252 A1 8/2014 Dines et al.
2014/0325335 A1 10/2014 Paulik et al.
2014/0337346 A1 11/2014 Barthel et al.
2014/0359559 A1 12/2014 Qi et al.
2015/0002611 A1 1/2015 Thapliyal et al.
2015/0003595 A1 1/2015 Yaghi et al.
2015/0006152 A1 1/2015 Dong et al.
2015/0012270 A1 1/2015 Reynolds
2015/0012844 A1 1/2015 Paulik et al.
2015/0016661 A1 1/2015 Lord
2015/0019200 A1 1/2015 Woodward et al.
2015/0063553 A1 3/2015 Gleim
2015/0113410 A1 4/2015 Bradley et al.
2015/0117626 A1 4/2015 Nord
2015/0120278 A1 4/2015 Waibel
2015/0120302 A1 4/2015 Mccandless et al.
2015/0142800 A1 5/2015 Thapliyal
2015/0149540 A1 5/2015 Barker et al.
2015/0154185 A1 6/2015 Waibel
2015/0154960 A1 6/2015 Ai et al.
2015/0201082 A1 7/2015 Zhao et al.
2015/0277725 A1 10/2015 Masterson et al.
2015/0286718 A1 10/2015 Wang et al.
2015/0310571 A1 10/2015 Brav et al.
2015/0339390 A1 11/2015 Urdiales et al.
2016/0019202 A1 1/2016 Adams et al.
2016/0026716 A1 1/2016 Yeager et al.
2016/0027442 A1 1/2016 Burton et al.
2016/0065742 A1 3/2016 Nasir et al.
2016/0078131 A1 3/2016 Venugopal et al.
2016/0117624 A1 4/2016 Flores et al.
2016/0165044 A1 6/2016 Chan
2016/0239272 A1 8/2016 Petri
2016/0275952 A1 9/2016 Kashtan et al.
2016/0352788 A1 12/2016 Sawhney et al.
2016/0357749 A1 12/2016 Fan et al.
2017/0011740 A1 1/2017 Gauci
2017/0034200 A1 2/2017 Costin et al.
2017/0046339 A1 2/2017 Bhat et al.
2017/0046659 A1 2/2017 Inomata et al.
2017/0060230 A1 3/2017 Faaborg et al.

(56) References Cited

U.S. PATENT DOCUMENTS

| | | | |
|---|---|---|---|
| 2017/0132208 | A1 | 5/2017 | Adavelli et al. |
| 2017/0163813 | A1 | 6/2017 | Young et al. |
| 2017/0169816 | A1 | 6/2017 | Blandin et al. |
| 2017/0177928 | A1 | 6/2017 | Cunico et al. |
| 2017/0186432 | A1 | 6/2017 | Aleksic et al. |
| 2017/0293618 | A1 | 10/2017 | Gorrepati et al. |
| 2017/0315985 | A1 | 11/2017 | Fitterer et al. |
| 2018/0011908 | A1 | 1/2018 | Aggarwal et al. |
| 2018/0018959 | A1 | 1/2018 | Des Jardins et al. |
| 2018/0077099 | A1 | 3/2018 | Silva et al. |
| 2018/0090154 | A1 | 3/2018 | Aaron et al. |
| 2018/0101761 | A1 | 4/2018 | Nelson et al. |
| 2018/0101824 | A1* | 4/2018 | Nelson ................ H04L 12/1831 |
| 2018/0130496 | A1 | 5/2018 | Mahapatra et al. |
| 2018/0143956 | A1 | 5/2018 | Skarbovsky et al. |
| 2018/0143970 | A1 | 5/2018 | Skarbovsky et al. |
| 2018/0158365 | A1 | 6/2018 | Roche |
| 2018/0160200 | A1 | 6/2018 | Goel et al. |
| 2018/0191907 | A1 | 7/2018 | Herrin et al. |
| 2018/0301046 | A1 | 10/2018 | Nedivi |
| 2018/0315429 | A1 | 11/2018 | Taple et al. |
| 2018/0315438 | A1 | 11/2018 | Davies et al. |
| 2018/0336001 | A1 | 11/2018 | Abuelsaad et al. |
| 2018/0342237 | A1 | 11/2018 | Lee et al. |
| 2018/0342249 | A1 | 11/2018 | Ohashi |
| 2018/0349086 | A1 | 12/2018 | Chakra et al. |
| 2018/0365232 | A1 | 12/2018 | Lewis et al. |
| 2019/0005023 | A1 | 1/2019 | Olsen et al. |
| 2019/0051301 | A1 | 2/2019 | Locascio et al. |
| 2019/0068477 | A1 | 2/2019 | Faulkner |
| 2019/0095803 | A1 | 3/2019 | Raskovic et al. |
| 2019/0139543 | A1 | 5/2019 | Rahmel et al. |
| 2019/0179501 | A1 | 6/2019 | Seeley et al. |
| 2019/0200121 | A1 | 6/2019 | Sinkov et al. |
| 2019/0220177 | A1 | 7/2019 | Guido et al. |
| 2019/0259387 | A1 | 8/2019 | Mertens et al. |
| 2019/0272559 | A1 | 9/2019 | Lee et al. |
| 2019/0327103 | A1 | 10/2019 | Niekrasz |
| 2019/0341050 | A1 | 11/2019 | Diamant et al. |
| 2020/0065342 | A1 | 2/2020 | Panuganty |
| 2020/0065387 | A1 | 2/2020 | Matthews et al. |
| 2020/0092339 | A1 | 3/2020 | Rakshit et al. |
| 2020/0186958 | A1 | 6/2020 | Husain et al. |
| 2020/0211537 | A1 | 7/2020 | Scheiner et al. |
| 2020/0211561 | A1 | 7/2020 | Degraye et al. |
| 2020/0228358 | A1 | 7/2020 | Rampton |
| 2020/0251089 | A1 | 8/2020 | Pinto |
| 2020/0251116 | A1 | 8/2020 | Sachdev et al. |
| 2020/0273453 | A1 | 8/2020 | Mody et al. |
| 2020/0293616 | A1 | 9/2020 | Nelson et al. |
| 2020/0296176 | A1 | 9/2020 | Bastide et al. |
| 2020/0394935 | A1 | 12/2020 | Ray et al. |

OTHER PUBLICATIONS

Advisory Action from U.S. Appl. No. 16/587,647, mailed Mar. 12, 2021, 2 pages.

Advisory Action from U.S. Appl. No. 15/900,414, mailed Apr. 28, 2020, 3 pages.

BestPractices, "Cloud Speech-to-Text," retrieved from https://cloud.google.com/speech-to-Text/docs/best-practices, on Oct. 17, 2019, 3 Pages.

Blood S., et al., "Contextualizing Virtual Assistants for More Effective Meetings in the Digital Workplace," Mar. 22, 2017, Gartner Research Note, retrieved from https://www.dropbox.com/s/k8m69qbsbry8niu/GARTContextualizing%20Virtual%20Assistants%20for%20More%20Effective%20Meetings%20in%20th%20Digitai%20Workplace_March%202017.pdf?dl=O, 12 Pages.

Dropbox Paper "Scriba: Y Combinator Funding Application," retrieved from https://paper.dropbox.com/doc/Scriba-Y-Combinator-Funding-Application--AlwgyvHSgUI_HAgZOfFQ1SR8Ny2fjiQXp63o, on Sep. 30, 2019, 5 Pages.

Final Office Action from U.S. Appl. No. 15/900,399, mailed Dec. 5, 2019, 17 pages.

Final Office Action from U.S. Appl. No. 15/900,414, mailed Feb. 6, 2020, 21 pages.

Final Office Action from U.S. Appl. No. 15/900,414, mailed Feb. 24, 2022, 19 pages.

Final Office Action from U.S. Appl. No. 15/900,414, mailed Mar. 31, 2021, 20 pages.

Final Office Action from U.S. Appl. No. 16/587,408, mailed Dec. 17, 2021, 24 pages.

Final Office Action from U.S. Appl. No. 16/587,424, mailed Apr. 9, 2021, 22 pages.

Final Office Action from U.S. Appl. No. 16/587,424, mailed Jan. 14, 2022, 28 pages.

Final Office Action from U.S. Appl. No. 16/587,647, mailed Dec. 2, 2020, 25 pages.

Final Office Action from U.S. Appl. No. 16/587,647, mailed Feb. 24, 2022, 44 pages.

Final Office Action from U.S. Appl. No. 16/587,647, mailed Oct. 6, 2022, 34 pages.

Final Office Action from U.S. Appl. No. 17/961,814, mailed Nov. 1, 2023, 17 pages.

Final Office Action from U.S. Appl. No. 18/316,040, mailed Mar. 27, 2024, 5 pages.

Geitgey A., "Machine Learning is Fun Part 6: How to do Speech Recognition with Deep Learning," Dec. 23, 2016, retrieved from https://medium.com/@ageitgey/machine-learning-isfun-part6-how-to-do-speech-recognition-with-deep-learning-28293c162f7a, on Oct. 17, 2019, 15 Pages.

Habibi M., et al., "Keyword Extraction and Clustering for Document Recommendation in Conversations", Apr. 2015, vol. 23 (9), pp. 746-759.

Hoffman R., "Using Artficial Intelligence to Set Information Free," Jun. 14, 2016, retrieved from https://sloanreview.mit.edu/article/using-artificial-intelligence-to-humanize-management-and-set-information-free/, on Sep. 30, 2019, 4 Pages.

Jon Fingas, "Google AI can pick out voices in a crowd," Apr. 12, 2018, retrieved from https://www.engadget.com/2018/04/12/google-ai-looking-to-listen-voice-separation/?guccounter=1, on Oct. 17, 2019, 3 Pages.

Kurt Varner, "Paper Strategy Update," Aug. 29, 2017, Quarterly Strategy Review, 56 Pages.

Mckinley D, "Design for Continuous Experimentation, " https://mcfunley.com//continuous-experimentation/, on Sep. 30, 2019, 21 Pages.

Maskey S., et al., "Summarizing Speech without Text Using Hidden Markov Models," Proceedings of the Human Language Technology Conference of the North American Chapter of the ACL, Association Computational Linguistic, Jun. 2006, pp. 89-92.

Non-Final Office Action from U.S. Appl. No. 16/587,424, mailed Jun. 17, 2022, 32 pages.

Non-Final Office Action from U.S. Appl. No. 15/900,399, mailed Aug. 30, 2019, 16 Pages.

Non-Final Office Action from U.S. Appl. No. 15/900,414, mailed Dec. 21, 2020, 18 pages.

Non-Final Office Action from U.S. Appl. No. 15/900,414, mailed Nov. 5, 2021, 18 pages.

Non-Final Office Action from U.S. Appl. No. 15/900,414, mailed Sep. 4, 2019, 17 pages.

Non-Final Office Action from U.S. Appl. No. 16/587,408, mailed May 18, 2022, 28 pages.

Non-Final Office Action from U.S. Appl. No. 16/587,408, mailed May 21, 2021, 20 pages.

Non-Final Office Action from U.S. Appl. No. 16/587,424, mailed Dec. 2, 2020, 17 pages.

Non-Final Office Action from U.S. Appl. No. 16/587,424, mailed Jan. 17, 2023, 59 pages.

Non-Final Office Action from U.S. Appl. No. 16/587,424 mailed Jun. 11, 2024, 53 pages.

Non-Final Office Action from U.S. Appl. No. 16/587,424, mailed Sep. 3, 2021, 19 pages.

Non-Final Office Action from U.S. Appl. No. 16/587,647, mailed Jul. 10, 2020, 20 pages.

(56) References Cited

OTHER PUBLICATIONS

Non-Final Office Action from U.S. Appl. No. 16/587,647, mailed Jun. 9, 2022, 42 pages.
Non-Final Office Action from U.S. Appl. No. 16/587,647, mailed Sep. 2, 2021, 35 pages.
Non-Final Office Action from U.S. Appl. No. 16/657,185, mailed Aug. 19, 2020, 7 pages.
Non-Final Office Action from U.S. Appl. No. 17/114,739, mailed Sep. 28, 2021, 12 pages.
Non-Final Office Action from U.S. Appl. No. 17/961,814 , mailed May 11, 2023, 22 pages.
Non-Final Office Action from U.S. Appl. No. 18/316,040, mailed Dec. 13, 2023, 17 pages.
Notice of Allowance from U.S. Appl. No. 15/900,399, mailed Apr. 7, 2020, 2 pages.
Notice of Allowance from U.S. Appl. No. 16/657,185, mailed Jan. 25, 2021, 5 pages.
Notice of Allowance from U.S. Appl. No. 16/657,185, mailed Oct. 21, 2020, 6 pages.
Notice of Allowance from U.S. Appl. No. 17/114,739, mailed Feb. 3, 2022, 2 pages.
Notice of Allowance from U.S. Appl. No. 17/114,739, mailed Jan. 20, 2022, 6 pages.
Notice of Allowance from U.S. Appl. No. 15/900,399, mailed Feb. 28, 2020, 19 pages.
Notice of Allowance from U.S. Appl. No. 15/900,414, mailed Sep. 15, 2022, 9 pages.
Notice of Allowance from U.S. Appl. No. 16/587,408 mailed Feb. 14, 2023, 20 pages.
Notice of Allowance from U.S. Appl. No. 18/316,040, mailed May 1, 2024, 7 pages.
Office Action for U.S. Appl. No. 15/900,409 mailed on Apr. 18, 2019, 9 pages.
Sharma G., "Voice Is the New Platform and the Future of Search, Commerce, and Payments," Jul. 16, 2016, retrieved from https://medium.com/@gaurav.sharma/voice-is-thenew-o-s-and-the-future-of-search-commerce-and-payments-64fc8cc848f6, on Sep. 30, 2019, 15 Pages.
Shin H.V., et al., "Dynamic Authoring of Audio with Linked Scripts," ACM, Oct. 2016, pp. 509-516.
Vega-Oliveros D.A., et al., ""This Conversation Will Be Recorded": Automatically Generating Interactive Documents from Captured Media," ACM, Sep. 2010, pp. 37-40.
"What Meetings Are Really Costing You," Oct. 17, 2019, retrieved from https://www.readytalk.com/sites/default/files/infographic-what-meetings-are-really-costingyou.pdf, on Oct. 17, 2019, 1 Page.
Yu Z., et al., "Smart Meeting Systems: A Survey of State-of-the-Art and Open Issues", Feb. 2010, ACM Computing Surveys (CSUR), vol. 42 (2), pp. 1-20.
Non-Final Office Action from U.S. Appl. No. 18/425,777, mailed Oct. 1, 2024, 13 pages.
Non-Final Office Action from U.S. Appl. No. 18/425,777, mailed on Sep. 25, 2025, 18 pages.
Final Office Action from U.S. Appl. No. 18/425,777 mailed on May 6, 2025, 18 pages.

* cited by examiner

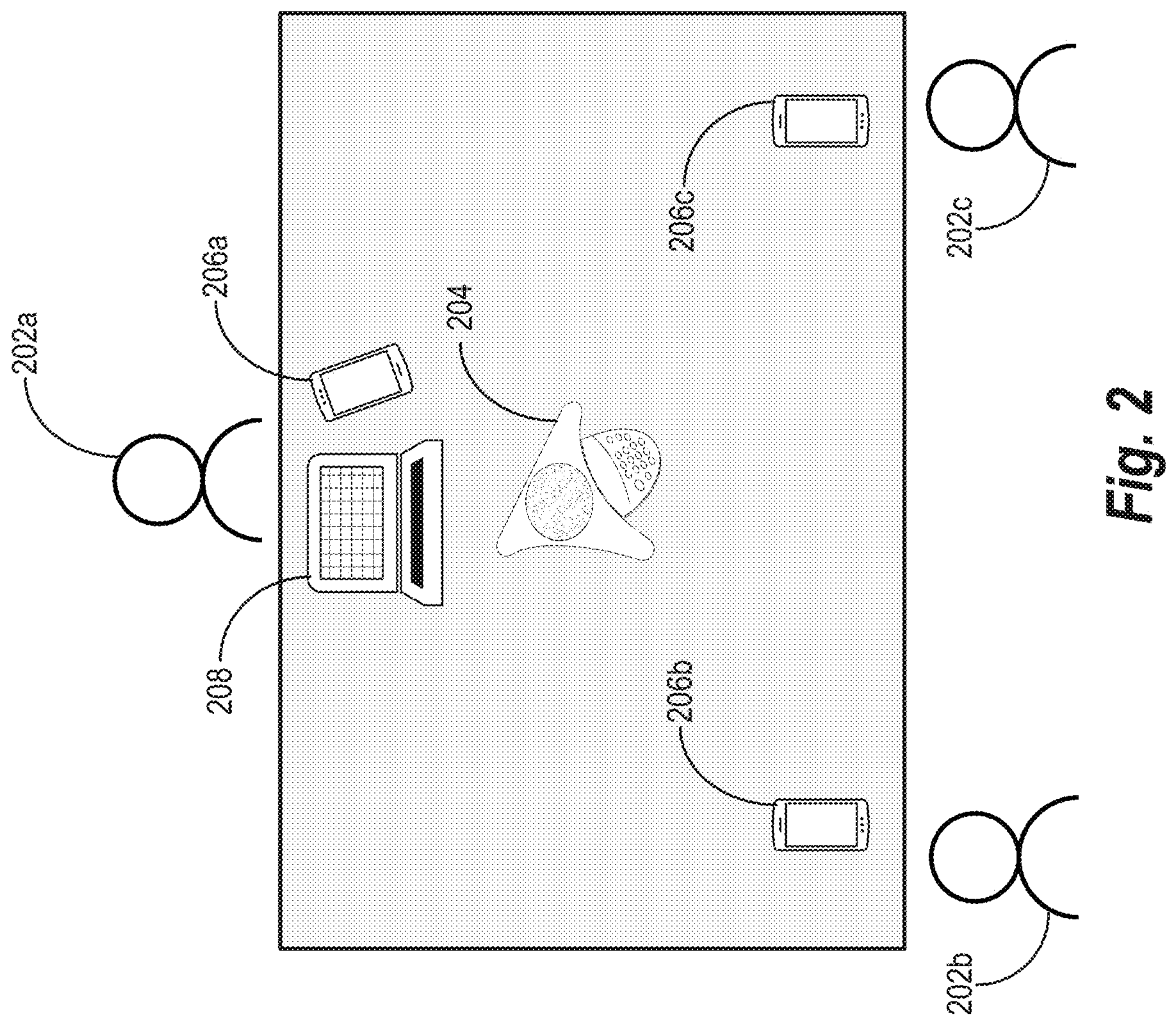
Fig. 2

GENERATING CUSTOMIZED MEETING INSIGHTS BASED ON USER INTERACTIONS AND MEETING MEDIA

CROSS-REFERENCE TO RELATED APPLICATIONS

This application is a continuation of U.S. patent application Ser. No. 18/316,040, filed May 11, 2023, which is a continuation of U.S. patent application Ser. No. 16/587,408, filed on Sep. 30, 2019, issued as U.S. Pat. No. 11,689,379, which claims the priority to and the benefit of U.S. Provisional Patent Application No. 62/865,614, filed Jun. 24, 2019. Each of the aforementioned applications is hereby incorporated by reference in its entirety.

BACKGROUND

Technological advances allow many different ways of holding meetings in person and remotely via audio/video streams. As a result, companies and individuals are increasingly using available technologies to conduct meetings on a daily basis. Unfortunately, many meetings are ineffective and unproductive, wasting what could otherwise be productive time for the participants. Additionally, even for effective meetings, many participants are unable to both focus on and understand the content of the meeting, while simultaneously taking notes regarding information covered in the meeting and any resulting action items required of the participants once the meeting is complete. Accordingly, traditional human methods for conducting meetings result in a number of inefficiencies.

To allow post-meeting access to meeting materials, many conventional systems for sharing/storing information for meetings use recorded audio and/or video of meetings. People wishing to review details of the meetings can then access the recordings and listen to/view all of the recordings or only portions of the recordings. While recording the audio and video allow for later review, the review can be a time-consuming process that requires participants to listen to or view the entire meeting a second time in order to find the portions of the recordings relevant to the participants. Specifically, finding specific information in an audio or video recording involves knowing where the information is located within a chronological timeline beforehand or manually searching the recording to find the information.

To address this, some conventional systems provide transcriptions of audio or video recordings of meetings. The audio/video transcriptions can include text documents that allow people to more easily identify relevant information from the recordings by skimming and/or searching the transcriptions. While transcriptions of audio or video recordings can improve the ability of people to find relevant information, finding the information many times requires knowing where the information is located in the text or knowing proper search terms when searching the text. Additionally, transcription software using language processing can often be inaccurate, leading to portions of transcribed text with incorrect words or even entire sentences, particularly when there is a lot of crosstalk during a meeting. Thus, conventional systems that rely primarily on transcriptions still typically require that participants review the full audio/video recordings to verify the accuracy of the transcription and/or locate the relevant portions of the transcription. Accordingly, a number of disadvantages are present with regard to conventional systems for conducting and reviewing information from meetings.

SUMMARY

One or more embodiments disclosed herein provide benefits and/or solve one or more of the foregoing and other problems in the art with systems, methods, and non-transitory computer readable storage media that provide customized meeting insights based on meeting media (e.g., meeting documents, audio data, and video data) and user interactions with client devices. For instance, the disclosed system uses audio data, video data, documents, and user inputs gathered by one or more client devices in connection with a meeting involving a plurality of users. The disclosed system analyzes the data, user inputs, and other information to determine portions of the gathered media data that are relevant to a specific user or to all meeting participants (e.g., based on timestamps of the user inputs and corresponding times in the media data). By analyzing the identified relevant portions, the disclosed system is able to generate meeting insights specific to the meeting and/or specific to attendees of the meeting. The meeting insights can include, for example, a summary of the meeting, a list of highlights from the information covered during the meeting, metrics regarding meeting management and participation, action items for individual participants of the meeting, and/or action items for automatic completion by the system itself. The system can further communicate the meeting insights to an organizer and/or participants in the form of electronic messages, notifications, documents, calendar items, reminders, and/or additions to to-do lists. The disclosed systems are thus able to improve the efficiency and productivity of meetings over conventional systems and traditional human methods.

Additionally, in one or more embodiments, the disclosed system uses data and documentation gathered from past meetings to provide automatic meeting insight generation for future meetings. For instance, the disclosed systems can utilize user-curated meeting insight data and corresponding meeting media to train a machine-learning model to output meeting insights for future meetings. Thus, during ongoing meetings or after completed meetings, the disclosed systems can use the trained machine-learning model to provide meeting insights to meeting participants in real time or without utilizing input to client devices in connection with the meetings.

Additional features and advantages of one or more embodiments of the present disclosure will be set forth in the description which follows, and in part will be obvious from the description, or may be learned by the practice of such example embodiments.

BRIEF DESCRIPTION OF THE DRAWINGS

Various embodiments will be described and explained with additional specificity and detail through the use of the accompanying drawings in which:

FIG. 2 illustrates a diagram of a physical environment in which a meeting involving a plurality of users occurs in accordance with one or more implementations;

DETAILED DESCRIPTION

Figure 1:
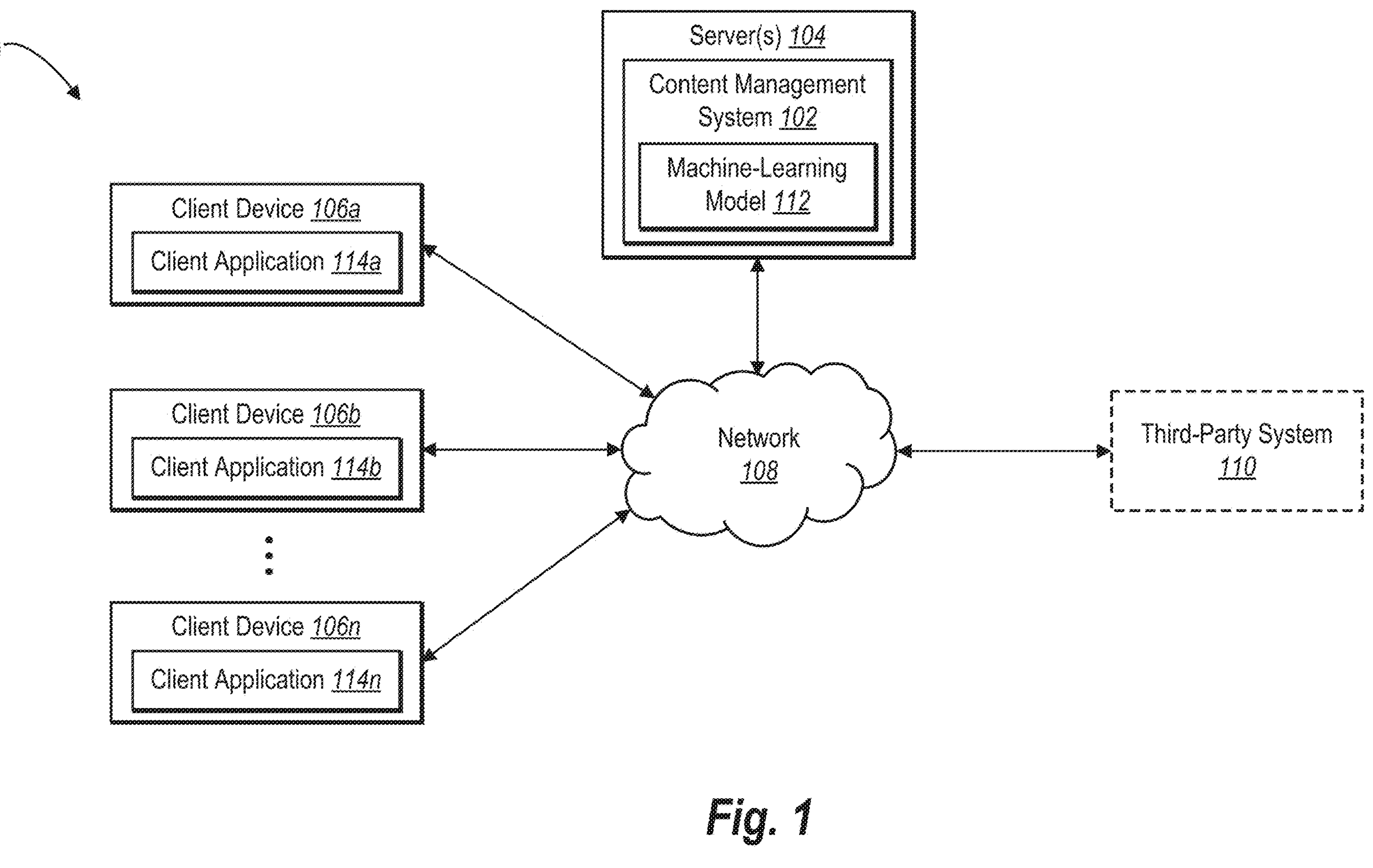
FIG. 1 illustrates a schematic diagram of an environment in which a content management system operates in accordance with one or more implementations.

One or more embodiments of the present disclosure include a digital content management system that generates meeting insights (e.g., summaries, highlights, or action items) for providing to one or more users based on media data, documentation, and user inputs to client devices associated with a meeting. For example, in some embodiments, the digital content management system (or simply "content management system") receives media data (e.g., audio data or video data) and information associated with user input(s) to client device(s) of users participating in a meeting (e.g., where the user inputs are provided by the users to indicate important or relevant portions of the meeting). The content management system then analyzes the media data (e.g., using natural language processing) in combination with the user inputs to determine portions of the media data (or other content items or materials) that correspond to the user inputs. If the content management system determines a portion of the meeting corresponds to at least one user input, the content management system generates a corresponding meeting insight, such as an electronic message to provide to a user including content related to the relevant portion of the meeting. The content management system can thus accurately and efficiently identify content or information from the meeting data (e.g., audio data, video data, documentation, and presentation materials) that is relevant to a user for quick and easy review.

Furthermore, the content management system can use past meeting data for automatically generating meeting insights for future meetings. Specifically, the content management system can use curated meeting insights (e.g., meeting insights that one or more users have generated or verified for accuracy and completion) to train a machine-learning model. The content management system can then use the machine-learning model to automatically output meeting insights (e.g., highlights, summaries, or action items) for future meetings either while the meetings are ongoing or after the meetings are finished. Thus, the content management system can generate and provide meeting insights to users even in the absence of user inputs to client devices.

As mentioned, the content management system analyzes media data, such as audio data associated with a meeting. In particular, one or more computing devices can record audio for a meeting and then communicate the audio data to the content management system. The content management system can analyze the audio data using, for example, natural language processing to determine what was said or done during the meeting. The content management system can also use the audio data to determine points in time corresponding to specific information from the meeting. In addition to audio data, the system can also analyze any other media associated with a meeting. For example, the system can analyze video of a meeting, documentation associated with a meeting, and/or electronic communications related to the meeting, to intelligently identify meeting insights to provide to meeting attendees.

In addition, the content management system analyzes user inputs to client devices in connection with the meeting to determine relevant portions of the meeting (e.g., relevant portions of an audio recording of the meeting). For instance, the content management system can communicate with one or more client devices to determine whether a user interacts with a client device during a meeting to mark a portion of the meeting that is relevant to the user by, for example, tapping on the client device (e.g., a tap or movement detected by an accelerometer of the client device). In additional embodiments, the content management system also uses data detected by one or more sensors or input devices to the client device, including a mouse, a keyboard, a camera (or other image capture device), a microphone, or a biometric sensor. The content management system can then determine a portion of the meeting that corresponds to a time when a detected user input occurred to identify the portion as relevant to the user.

As indicated above, in some embodiments, the user provides input to mark portions of a meeting that are relevant to the user for processing by the content management system. In yet further embodiments, different user inputs (e.g., a single tap vs. a double tap) can trigger different actions by the content management system. To illustrate, a first user input can signal to the system to highlight a portion of the meeting for the user, a second user input can signal to the system to create an action item for the user, a third user input can signal to the system to extract a portion of audio data for later review by the user, and so on. Accordingly, using minimal user inputs, the content management system automatically provides customized functionality to a user without requiring significant time or focus from the user.

In some embodiments, after identifying portions of a meeting (and corresponding portions of audio or other data associated with the meeting), the content management system generates meeting insights for a user or multiple users. The generated meeting insights can include content based on the analyzed data associated with the meeting. For example, a meeting insight can include a meeting summary, highlights from the meeting, action items, etc., as will be explained in more detail below. The content management system can deliver meeting insights to users by way of electronic messages, electronic documents (e.g., online collaborative documents), storage folders, notifications, calendar items, additions to a to-do list, or other content items, etc. To illustrate, in some embodiments, the system generates an electronic message based on a portion of audio (e.g., based on speech identified in the portion of audio) corresponding to a relevant portion of a meeting and generates an electronic message for the user including content related to isolated speech from the portion of audio. The content management system can also identify documents (e.g., slides, images, notes) or video corresponding to a relevant portion of the meeting and generate a message for the user including content from the identified documents. Additionally, the content management system can generate a document, notification, or other electronic message that includes a description of the relevant portion, a transcription of the relevant portion, an audio clip of the relevant portion, or other content related to the relevant portion. The content management system can then provide the generated content to the user, store the generated content in association with an account of the user, or otherwise provide the user access to the generated content.

Furthermore, the content management system can provide real-time meeting assistance and feedback based on meeting materials, audio data, and/or inputs to user devices. For instance, the content management system can provide information, statistics, prompts, and updates to a meeting presenter in real-time during a meeting and also after a meeting is complete by analyzing content items (e.g., documents, audiovisual media, or other digital files) and user input related to or gathered from the meeting. To illustrate, the content management system can analyze a meeting agenda and corresponding audio data for a meeting to determine, for example, that the meeting presenter has forgotten or skipped an agenda item. Based on this determination, the system can provide a notification to the presenter to remind the presenter to cover the skipped agenda item. In addition to real-time feedback and assistance, the content management system can also provide feedback to the meeting presenter in the form of various metrics or insights related to the presenter's performance and/or the effectiveness of the meeting once the meeting is complete. As another example, the content management system can analyze audio data, video data, biometric data, and/or user input data to determine a sentiment score for each meeting attendee. Based on the sentiment scores, the system can determine an effectiveness of a meeting moderator/presenter or a particular topic/media being presented, and then provide real-time feedback to help improve the effectiveness of the meeting or the engagement of meeting attendees (e.g., by suggesting a change in topic or presentation style).

In one or more embodiments, as mentioned, the content management system also uses data from past meetings to train a machine-learning model to automatically tag or suggest insights for meetings. In particular, the content management system can use a training dataset including manually-labeled insight data corresponding to past meetings to train the machine-learning model. The content management system can then input audio data for a meeting into the trained machine-learning model, which outputs insights or suggestions by analyzing the audio data and other information associated with the later meeting. Furthermore, the machine-learning model, or another machine-learning model, can output analytics for a meeting (e.g., sentiment scores, attendance). The content management system can also use machine-learning to determine whether to schedule/cancel future meetings based on feedback associated with past meetings indicating an effectiveness of the past meetings.

As briefly mentioned, the content management system described herein provides advantages over conventional systems. Specifically, the content management system improves the accuracy of analyzing data related to meetings and generating corresponding content (e.g., meeting insights) for use by meeting participants. For example, the content management system accurately analyzes the data to provide meetings insights without the need for user-generated insights and with added utility relative to conventional audio transcriptions. Additionally, the content management system improves the efficiency of computing devices that store and disseminate information related to meetings. For instance, the content management system improves efficiency by leveraging both user input data and media data to automatically generate succinct summaries or other content items that are quickly reviewable and require less storage space. The content management system can also improve flexibility by allowing for personalization of insight data per recipient user. In contrast, as described above, conventional systems merely provide audio/video data or dense transcriptions that require excessive computer resources and also require users to manually scan/search through the materials to find relevant portions.

United States Provisional Application titled GENERATING IMPROVED DIGITAL TRANSCRIPTS UTILIZING DIGITAL TRANSCRIPTION MODELS THAT ANALYZE DYNAMIC MEETING CONTEXTS, filed Jun. 24, 2019, and Unites States Provisional Application titled UTILIZING VOLUME-BASED SPEAKER ATTRIBUTION TO ASSOCIATE MEETING ATTENDEES WITH DIGITAL MEETING CONTENT, filed Jun. 24, 2019, are each hereby incorporated by reference in their entireties.

Additional detail will now be provided regarding the content management system in relation to illustrative figures portraying exemplary implementations. To illustrate, FIG. 1 includes an embodiment of an environment 100, in which a content management system 102 can operate. In particular, the environment 100 includes server(s) 104 and client devices **106*a*-106*n* in communication via a network 108. Optionally, in one or more embodiments, the environment 100 also includes a third-party system 110. As illustrated, the content management system 102 includes a machine-learning model 112. Moreover, the client devices 106*a*-106*n* include client applications 114*a*-114*n***.

In one or more embodiments, the content management system 102 uses data related to a meeting obtained from the client devices **106*a*-106*n* to provide meeting insights to one or more users associated with a meeting. Specifically, the content management system 102 receives media data associated with a meeting, such as audio data including at least one audio recording of the meeting, from one or more of the client devices 106*a*-106*n*. For instance, a client device (e.g., client device 106*a*) can connect to the server(s) 104 to transmit a digital audio recording of meeting audio to the content management system 102. The client device can provide the digital audio recording to the content management system 102** in real-time (e.g., while the meeting is ongoing) or after the meeting is complete.

In one or more embodiments, the client device **106*a* utilizes a client application (e.g., client application 114*a*) to connect to the content management system 102 and communicate data to the content management system 102. For example, the client applications 114*a*-114*n* can include an online meeting application, video conference application, audio recording application, content management application, and/or other application that allows the client devices 106*a*-106*n* to manage content items associated with a meeting and record audio/video and transmit the recorded media to the content management system 102. According to at least one embodiment, a single client device (e.g., client device 106*a*) captures audio data to send to the content management system 102, while other client devices (e.g., client devices 106*b*-106*n*) capture data related to user inputs detected during the meeting. Alternatively, more than one client device can provide audio data to the content management system 102** and/or allow users to provide input during the meeting.

As used herein, the term "client device" refers to any device that collects or presents data associated with a meeting. In particular, a client device can include a personal device (e.g., phone/laptop computer/desktop computer), an image capture device (e.g., a digital camera or webcam), a microphone device, or a television/monitor. Furthermore, as used herein, the term "user input" refers to data collected from a user by a client device. Specifically, a user input can include direct interactions with a client device (e.g., touch inputs, keyboard inputs, mouse inputs), detected gestures (e.g., hand movements, eye movements, or other body movements), or audio inputs to a client device.

As used herein, the term "content item" refers to digital content that includes text or audiovisual data. Specifically, a content item can include a text document, one or more images, video, audio, or some combination of text, images, video, or audio. Accordingly, a content item can include information presented during a meeting or otherwise in connection with a meeting (e.g., information about a topic of the meeting). Additionally, the content management system 102 can store content items for individual users or groups of users locally (e.g., on individual user devices) or online (e.g., in a distributed environment).

In one or more embodiments, the client device 106*a* (or another client device) utilizes a client application to communicate additional media data or other content items to the content management system 102 in connection with a meeting. For instance, the client applications 114*a*-114*n* can send images, slides, text documents, video data, or other materials associated with a meeting to the content management system 102. To illustrate, a client device can send materials to the content management system 102 during a meeting or after the meeting. Materials can include documents or other media data presented during the meeting or generated during the meeting.

Additionally, each of the client devices 106*a*-106*n* can include a computing device associated with one or more users. For example, a client device can include a mobile device (e.g., smartphone, laptop, tablet), desktop computer, smart TV, digital conference phone, or other computing device capable of recording audio, communicating with the content management system 102, and/or displaying electronic messages from the content management system 102. Furthermore, depending on the type and use of the client devices 106*a*-106*n*, a client device may correspond to a single user or to a plurality of users. Additional detail for the client devices 106*a*-106*n* and for other computing devices is described in more detail below with respect to FIGS. 7-8.

As used herein, the term "electronic message" refers to a computer-based message that includes information or content related to relevant portions of meeting data. Specifically, an electronic message includes an application or operating system notification, a text document, an audio or video clip, or other content item. For example, an electronic message can include a text document with a bullet list of meeting highlights from a meeting or a summary of content presented/discussed during a meeting. Additionally, an electronic message can include an audio or video clip from audio or video data captured during a meeting or in presentation materials for a meeting.

As mentioned above, the content management system 102 determines relevant portions of meeting data (e.g., audio data) for one or more users. As used herein, the term "relevant portion" refers to a portion of digital audio data, documents, or other content items that include information that is useful or important to a user. For example, a relevant portion of audio data can include a portion of audio discussing a user's responsibilities, information that the user wants to review later, information regarding upcoming events relevant to a user, or any other information a user deems important. Additionally, a relevant portion of meeting data can include a portion of a digital representation of a document or media presented or generated during a meeting (e.g., slides, images, agendas, notes, video data) that is relevant to a user.

As further mentioned above, the content management system 102 generates meeting insights based on analyzed data associated with a meeting. As used herein, the term "meeting insights" refers to content generated by the content management system 102 based on an analysis of data related to a meeting. Meeting insights can include, for example, a meeting summary, highlights from the meeting (e.g., portions of the meeting marked by users as important), action items resulting from or discussed in the meeting, subsequent meetings scheduled during the meeting, a list of attendees of the meeting, metrics or analytics related to the meeting, or other information from the meeting that is of interest to one or more users. As used herein, the term "summary" refers to a text summary of recognized speech in audio data or a text summary of materials associated with a meeting. A summary can provide an overall description or listing of items and topics discussed during the meeting. Also as used herein, the term "action item" refers to a task or operation that is assigned to a user in connection with a meeting. For example, an action item can include a task discussed during a meeting for completion by a user after the meeting is complete. In some embodiments, an action item can be associated with one or more specific users. An action item can also be associated with a date or time, by which completion of the action item is required.

The content management system 102 can use natural language processing or other audio analysis to analyze audio data. In one or more embodiments, the content management system 102 utilizes computing devices of the server(s) 104 for performing audio analysis. In one or more alternative embodiments, the content management system 102 utilizes audio processing from a third-party system (e.g., third-party system 110) to analyze audio data. In yet additional examples, the content management system 102 can use audio processing on the server(s) 104 and on a third-party system (e.g., based on the size of audio data, language of audio in the audio data, or during separate stages of audio processing) to analyze audio data.

To determine relevant portions of meeting data, the content management system 102 analyzes audio data, meeting materials, and inputs to client devices. In one or more embodiments, in connection with audio data (and in some cases other meeting documentation or media) received from one or more of the client devices 106*a*-106*n*, the content management system 102 also receives input data for one or more of the client devices 106*a*-106*n*. Specifically, a client device can provide information about input to the client device during a meeting to the content management system 102. For instance, the client device can notify the content management system 102 in response to a keyboard input, mouse input, touch screen input, microphone input, video input, or sensor input (e.g., accelerometer/gyroscope, heart rate monitor or other biometric sensor) during the meeting. The content management system 102 can use the input information to identify specific portions of the audio data and then determine that those portions include relevant information for one or more users.

In one or more embodiments, the content management system 102 determines relevant portions of a meeting for a plurality of users. For example, the content management system 102 can determine portions that are relevant for attendees/invitees of a meeting. To illustrate, the content management system 102 can determine relevant portions for generating a summary of a meeting to all attendees/invitees of the meeting. Alternatively, the content management system 102 can determine different relevant portions for separate users or groups of users. To illustrate, the content management system 102 can determine a first relevant portion for generating a first summary to a first user and a second relevant portion for generating a second summary to a second user.

After generating summaries or other electronic messages based on relevant portion(s) of a meeting, the content management system 102 provides the generated content to the users. For instance, the content management system 102 can provide a notification, document, or other electronic message or content item to a client device (e.g., client device 106*a*) during and/or after the meeting. The client device can then use the client application to display the electronic message to a user.

As mentioned, the content management system 102 can include a machine-learning model 112. The content management system 102 can train the machine-learning model 112 to automatically identify meeting highlights, action items, and other meeting insight information using data from past meetings. The machine-learning model 112 can then output suggestions or meeting insights for future meetings, even in the absence of (or lack of sufficient) device input data. Additionally, the content management system 102 can train the machine-learning model 112 or another machine-learning model to output predictions of meeting moderation data or meeting analytics (e.g., sentiment predictions, attendance) for future meetings based on analytics for past meetings. The content management system 102 can thus use machine-learning for a variety of different automated and predictive operations.

Although the environment 100 of FIG. 1 is depicted as having various components, the environment 100 may have any number of additional or alternative components (e.g., server(s) 104, client devices 106*a*-106*n*, and third-party system 110). For example, the content management system 102 can receive audio data, device inputs, content items, or other meeting data from any number of client devices. Furthermore, the content management system 102 can communicate with (or include) any number of machine-learning models to analyze audio data/meeting materials and generate predictions, suggestions, or automated operations in connection with providing meeting insights. Additionally, more than one component or entity in the environment 100 can implement the operations of the content management system 102 described herein. For instance, the content management system 102 can alternatively be implemented entirely (or in part) on a single computing device.

As discussed, the content management system 102 can generate meeting insights for a meeting involving a plurality of users. FIG. 2 illustrates an example of a meeting environment 200 in which a plurality of users 202*a*-202*c* is involved in a meeting. During the meeting, each of the users 202*a*-202*c* can use one or more client devices during the meeting to record audio data and monitor user inputs or other inputs to the client devices. For example, the meeting environment 200 can include a first client device 204 such as a conference phone device capable of connecting a call between the users 202*a*-202*c* and at least one remote user. The users 202*a*-202*c* can thus hold a meeting with remote user(s) by communicating via a client device.

Additionally, the meeting environment 200 can also include additional client devices associated with one or more of the users 202*a*-202*c*. In particular, each user can use at least one client device (e.g., client devices 206*a*-206*c*) to view details associated with the meeting. For example, a user can use a client device to run a client application with streaming video, streaming audio, media presentation, instant messaging or other text communications, collaborative content items (e.g., online, shared text/media documents), and/or other digital communication methods for sharing information during the meeting. The users can thus use the client devices 206*a*-206*c* to provide supplemental materials or content as part of the meeting.

As shown, a user can also be associated with more than one client device. For instance, a user (e.g., user 202*a*) can use more than one client device (e.g., client device 206*a* and client device 208) during a meeting to perform one or more different functions with each client device. To illustrate, a user can use a first device to display information associated with the meeting and a second device to provide input in connection with the meeting. More specifically, a meeting presenter can use a laptop or tablet (e.g., client device 208) to display information that the meeting presenter is presenting during the meeting, including slides or other content. The meeting presenter can also use a smartphone (e.g., client device 206*a*) to record audio, communicate with one or more other users, or perform an action to communicate information to the content management system 102.

In one or more embodiments, the content management system 102 communicates with a client application on a client device to obtain input information associated with a meeting. For example, the client devices 206*a*-206*c* and/or client device 208 include one or more client applications that allow users to provide feedback or other input regarding the meeting to the content management system 102. Specifically, as mentioned, the content management system 102 uses input to client devices in combination with analysis of data (e.g., audio data) to determine relevant portions of media or documentations for a user. For instance, the content management system 102 can determine when a user (e.g., user 202*b*) interacts with a client device (e.g., client device 206*b*) during the meeting. The content management system 102 can then determine a specific time or portion of the audio data (or a specific portion of other materials associated with the meeting) corresponding to the user input and determine that the corresponding portion of audio data contains relevant information for the user or for one or more other users.

For example, the client devices 206*a*-206*c* and/or client device 208 include one or more client applications that can detect certain user inputs. To illustrate, a client device (e.g., client device 206*a*) can include a client application that allows the client device to detect when a user taps on the device. The client application can use information from an accelerometer, touchscreen, or gyroscope to detect the tap. The client application can be running in the background of the client device during the meeting so that the client device can detect the interaction even if the client device is in standby/sleep mode. For instance, during the meeting, the user can tap, move, or otherwise interact with the client device to indicate an important point in the meeting.

Additionally, a client device (e.g., client device 208) can detect when a user types on a keyboard. The client device can determine that the user is typing on a keyboard within a client application (e.g., conferencing software, word processing software, note software) during a specific time period of the meeting. For example, the user can use the client application to take notes during the meeting if the user determines that the information discussed at that point in time is important.

Furthermore, a client device (e.g., any of the client devices 204, 206*a*-206*c*, 208 in FIG. 2) can detect voice commands related to information discussed in a meeting. In particular, the client device can allow a user to provide voice commands in connection with items discussed in a meeting. The voice command can be in relation to something the user or another user said. For instance, a user can say phrases or words such as "Note this," or "Remind me later," that indicate an important topic or action item discussed in a meeting.

In additional embodiments, the client device detects inputs from any number of input devices to the client device during a meeting. For instance, the client device can detect inputs from a mouse to determine when a user clicks or moves the mouse in a certain way indicating a relevant portion of a meeting. The client device can also analyze video data to detect a user input (e.g., a specific motion, facial movements, body language of a user), materials displayed within the video data, or other visual cues to determine input data indicating relevant portions of a meeting. Additionally, the client device can detect inputs from other sensors or input devices such as heart rate monitors or other biometric sensors that can indicate relevant information of a meeting.

After detecting a user input, a client device can send the input data to the content management system 102. For instance, some or all of the client devices 204, 206*a*-206*n*, 208 can include a client application that causes the client devices 204, 206*a*-206*n*, 208 to communicate with the content management system 102. The client application can be dependent on the type of each client device, such that different types of client devices are running different client applications (e.g., mobile application on a smartphone, desktop application on a laptop or desktop computing device) that cause the client devices to communicate with the content management system 102. Alternatively, at least one client device can communicate with another client device in the vicinity (e.g., via a wireless communications technology such as Bluetooth or other local wireless communications technology) to send data to the content management system 102.

In one or more embodiments, the client devices 204, 206*a*-206*c*, 208 communicate with the content management system 102 to provide device input data and audio data in real-time. Specifically, the content management system 102 can receive device input data and audio data while the meeting is ongoing. The content management system 102 can then analyze the data and provide feedback and/or provide other message insights to one or more of the client devices 204, 206*a*-206*c*, 208 in real-time. For example, the content management system 102 can determine relevant portions of meeting data as the meeting data is received in response to receiving device input data during specific portions of the meeting data.

In alternative embodiments, the content management system 102 receives meeting data and/or device input data after a meeting is complete. Specifically, a client device can generate data (e.g., recorded audio data) from a meeting and then synchronize the meeting data with the content management system 102. For example, the client device can synchronize audio data with the content management system 102 in response to a user selecting an option to upload the audio data to the content management system 102 using a content management application (e.g., by storing an audio data file in a folder that synchronizes with the content management system 102). Additionally, the client device can also provide the device input data during or after the meeting is complete. The device input data can include a timestamp so that the content management system 102 can determine the corresponding time in the audio data or other meeting data.

Once the content management system 102 has meeting data and device input data, the content management system 102 can use the data to generate meeting insights. In particular, the content management system 102 analyzes the meeting data to determine content (e.g., determine what is being said, generated, or presented) for the meeting. For instance, the content management system 102 can utilize natural language processing to generate a transcription for audio data. The content management system 102 can store the transcription in memory and/or with one or more user accounts of one or more users associated with the meeting.

The content management system 102 can then analyze the transcription to identify information associated with the audio content. For example, the content management system 102 can identify one or more users (e.g., using voice recognition technology) during the meeting and determine what each user says during the meeting. The content management system 102 can also identify a context of the audio data based on what the one or more users discuss, including one or more subject matters being discussed during one or more portions of the meeting. The content management system 102 can also determine times of different items being discussed during the meeting.

Furthermore, the content management system 102 can analyze content items associated with a meeting to identify relevant information from the associated content items. To illustrate, the content management system 102 can analyze text or metadata of content items generated and synchronized with the content management system 102 to determine text content relative to audio data for the meeting. The content management system 102 can also use video/image analysis to determine content of materials presented or generated (e.g., on a screen, whiteboard, or writing material) during the meeting.

The content management system 102 also correlates identified portions of audio data, meeting materials, or other meeting data with device input data from one or more client devices associated with the meeting. Specifically, in response to determining that a client device received an input from a user at a specific time during the meeting, the content management system 102 determines a portion of the audio data or other materials corresponding to the specific time of the input to the client device. To illustrate, if a user provides an input to a client device at a specific time during a meeting, the content management system 102 can mark the portion of the audio data, document, or other content item corresponding to the device input as relevant based on a timestamp of the device input and a corresponding timestamp of the relevant portion of the audio data or other materials. The content management system 102 can then extract text, images, audio, or video from a portion of meeting data marked as relevant to use in generating meeting insights.

The content management system 102 generates meeting insights for meeting data to send to one or more client devices of one or more users associated with a meeting. For instance, the content management system 102 can determine one or more users associated with the meeting. To identify users associated with the meeting, the content management system 102 can utilize information about the meeting provided by one or more client devices including, but not limited to, a list of users who were invited to the meeting, client devices providing data to the content management system 102 for the meeting, and client devices located in a vicinity of a location for the meeting.

Furthermore, the content management system 102 can provide meeting highlights to users who may not have attended the meeting (in person or via network connection). For instance, the content management system 102 may determine that one or more portions of the meeting data are relevant to a user that did not attend the meeting based on an organizational structure of a business account with the content management system 102. To illustrate, the content management system 102 can determine that a meeting is relevant to a plurality of users based on the users being a part of a department (e.g., "engineering") associated with the meeting, even if one or more of the users did not attend the meeting. Additionally, the content management system 102 can determine that the meeting data may be relevant to another user based on the user being involved in previous meetings on a similar subject matter.

The content management system 102 then generates meeting insights to provide to identified users (e.g., to one or more client devices associated with the identified users) based on relevant portions of meeting data. Specifically, the content management system 102 uses identified content of a relevant portion (e.g., text created from audio data using natural language processing) to generate an electronic message. For example, the content management system 102 can generate a summary document for the user including the identified content, or otherwise describing the identified content, of the relevant portion. As described in more detail below with respect to FIGS. 4E and 5A-5B, a summary document can include information (e.g., summaries, highlights, action items) generally relevant to a plurality of users or customized for a given user.

The content management system 102 can alternatively generate a notification for display within a client application or on an operating system of a client device of an identified user. For example, as described in more detail below with respect to FIG. 4C, the content management system 102 can generate notifications for providing meeting moderation to a meeting presenter while the meeting is ongoing. Additionally, the content management system 102 can provide a message to a meeting presenter indicating meeting feedback for a meeting, as described in more detail with respect to FIG. 4D.

While the embodiments described herein include meeting insights such as meeting summaries, highlights, action items, meeting moderation, and meeting feedback, the content management system 102 can also perform other functions related to a meeting. For instance, the content management system 102 can automatically complete one or more operations associated with a meeting. To illustrate, the content management system 102 can disseminate content items to one or more users or provide suggestions to one or more users to share the content items with one or more other users.

In one or more embodiments, the content management system 102 also synchronizes data across a plurality of client devices. For example, the content management system 102 can synchronize content across devices associated with a user account. To illustrate, as shown in FIG. 2, a user 202*a* can be associated with a plurality of client devices (client device 206*a*, client device 208). The user 202*a* can sign into a user account maintained by the content management system 102 on each of the client devices. The content management system 102 can synchronize content across both client devices so that the user 202*a* is able to access the content from each client device. Accordingly, the user 202*a* can access audio data, audio transcripts, content items associated with the meeting (e.g., presentation materials), meeting insights, or other content stored by the content management system 102 on each of the client devices.

Figure 3:
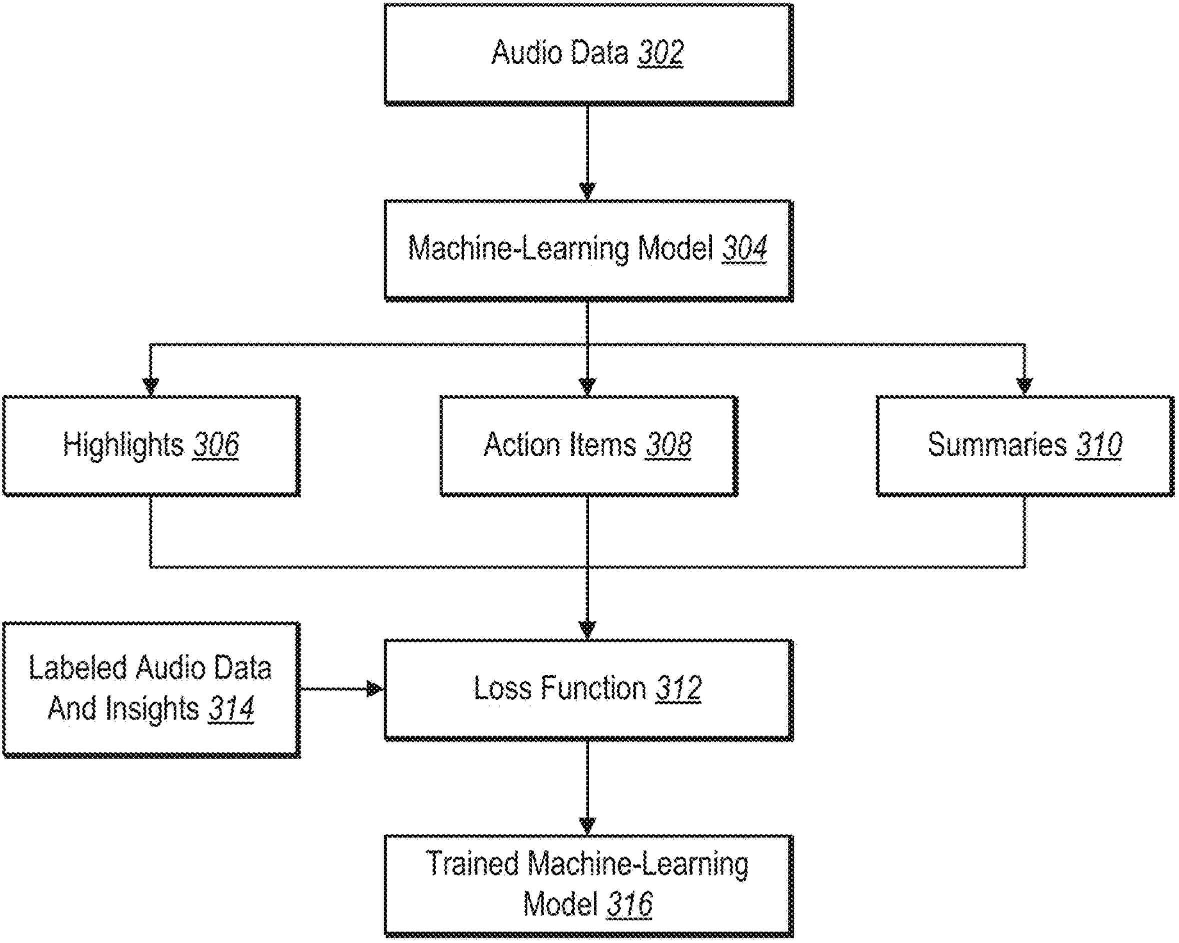
FIG. 3 illustrates a flow diagram illustrating operations for training a machine-learning model to generate meeting insights in accordance with one or more implementations.

The content management system 102 can also use the information from past meetings to train one or more machine-learning models for use in generating meeting insights for future meetings. FIG. 3 illustrates a diagram of a flowchart of a series of acts 300 for training a machine-learning model to automatically generate meeting insights for a meeting. As an overview, training the machine-learning model includes applying a machine-learning model to data associated with a meeting to output automatically generated meeting insights. The content management system 102 then uses curated data associated with the meeting to refine the machine-learning model so that the machine-learning model outputs more accurate meeting insights for future meetings.

As shown in FIG. 3, the content management system 102 uses audio data 302 associated with a meeting as an input to a machine-learning model 304. In particular, the content management system 102 can obtain audio data stored in a content database that includes content provided by one or more client devices associated with one or more users. For example, one or more client devices can record audio data for a meeting and then provide the audio data to the content management system 102. In one or more embodiments, the content management system 102 inputs audio data from a plurality of past meetings into the machine-learning model 304. Training the machine-learning model 304 on larger datasets of audio data improves accuracy by providing the machine-learning model 304 with exposure to a variety of scenarios involving a number of different subject matters, users, and client devices involved with the different meetings. Although FIG. 3 illustrates an example based on audio data, one will appreciate that the disclosed features can be implemented with other types of meeting data, such as video data, presentation materials, or documentation associated with meetings.

As used herein, the term "machine-learning model" refers to a computer representation that can be tuned (e.g., trained) based on inputs to approximate unknown functions. In particular, the term "machine-learning model" can include a model that utilizes algorithms to learn from, and make predictions on, known data by analyzing the known data to learn to generate outputs that reflect patterns and attributes of the known data. For instance, a machine-learning model can include but is not limited to, decision trees, support vector machines, linear regression, logistic regression, Bayesian networks, random forest learning, dimensionality reduction algorithms, boosting algorithms, artificial neural networks, deep learning, etc. Thus, a machine-learning model makes high-level abstractions in data by generating data-driven predictions or decisions from the known input data.

The content management system 102 uses the machine-learning model 304 to generate meeting insights for a meeting based on audio data for the meeting. Specifically, the content management system 102 uses the machine-learning model 304 to output highlights 306, action items 308, and/or summaries 310 based on the audio data. For example, the machine-learning model 304 generates a predicted highlight corresponding to a portion of the audio data based on natural language processing or other audio analysis of the audio data to determine the context of the portion of the audio data. Accordingly, the machine-learning model 304 can determine that a portion of the audio data is of interest to one or more users associated with the meeting and then provide a highlight (e.g., a summarized bullet point for that portion of the audio).

Furthermore, the machine-learning model 304 can output action items 308 corresponding to one or more users. In particular, the machine-learning model 304 generates an action item to indicate that at least a portion of the audio data includes an indication of an action that one or more users should perform in accordance with a subject matter discussed within the meeting. For example, the machine-learning model 304 can identify phrases, words, or context in the audio data that indicates an operation to be performed and then generate a reminder, notification, or other content item that indicates to a user the operation to be performed.

Additionally, the machine-learning model 304 can output summaries 310 of audio data. For instance, the machine-learning model 304 can determine the content of one or more portions of audio data or of the audio data as a whole based on a transcription of the audio data. The machine-learning model 304 can then generate a summary of the content by generating a shorter version of the content that describes the content as a whole for the one or more portions of audio data. A summary can also include a content item with additional information, such as highlights or action items.

After the machine-learning model 304 generates highlights 306, action items 308, and summaries 310, the content management system 102 generates a loss function 312 for the machine-learning model 304. Specifically, the content management system 102 uses labeled audio data and insights 314 to create the loss function 312. More specifically, the content management system 102 uses curated audio data with portions of the audio data marked as relevant, in addition to using manually generated insights (e.g., manually generated highlights, action items, and summaries). The content management system 102 can compare the labeled audio data and insights 314 to the outputs of the machine-learning model 304 and then generate the loss function 312 based on the difference.

The content management system 102 uses the loss function 312 (e.g., the measure of loss resulting from the loss function 312) to train the machine-learning model 304. In particular, the content management system 102 utilizes the loss function 312 to correct parameters that resulted in incorrect predicted outputs from the machine-learning model 304. For instance, the machine-learning model 304 can use the loss function 312 to modify one or more functions or parameters in its prediction algorithms to minimize the loss function 312 and reduce the differences between the outputs (i.e., highlights 306, action items 308, and summaries 310) and the labeled audio data and insights 314. By minimizing the loss function 312, the machine-learning model 304 improves the accuracy of generating insight data for future meetings. Additionally, adjusting the machine-learning model 304 based on the loss function 312 results in a trained machine-learning model 316.

Furthermore, although not illustrated in FIG. 3, the content management system 102 can generate predicted meeting insights for future meetings based on further provided audio data. For example, the audio data 302 can include device input data from one or more client devices. In at least some embodiments, the content management system 102 may receive limited device input data and may therefore use the machine-learning model 304 to generate meeting insights using predictive algorithms in addition to the methods described above with respect to FIG. 2. The content management system 102 may thus generate meeting insights even with limited or no device input data.

Furthermore, as the content management system 102 generates meeting insights for audio data provided to the content management system 102 from one or more client devices and/or receives device input data from the one or more client devices, the machine-learning model 304 can continuously update to fine-tune the meeting insight generation process. For instance, the content management system 102 can generate meeting insights for separate audio data uploaded to the content management system 102 from one or more client devices. When the content management system 102 generates the new meeting insights for additional audio data, the machine-learning model 304 can use the new insights and curated insight data to update the loss function 312, and thus update the machine-learning model 304 itself.

In one or more additional embodiments, the content management system 102 utilizes additional meeting data as an input to the machine-learning model 304. Specifically, the content management system 102 can provide meeting documentation including presentation materials, documents, or other content items presented or generated during a meeting to the machine-learning model 304. For example, the content management system 102 can use meeting agendas, synchronized notes, video data, or other materials in connection with a meeting to train the machine-learning model 304 to output meeting insights for future meetings.

As mentioned previously, the content management system 102 can provide meeting insights to one or more users at one or more client devices during or after a meeting. FIGS. 4A-4E illustrate embodiments of a client device that uses the content management system 102 to provide meeting insights based on audio data or other meeting data associated with a meeting. Specifically, FIGS. 4A-4E illustrate graphical user interfaces of a client application running on a client device associated with a meeting presenter. The client device of the meeting presenter displays content associated with the meeting, provides data to the content management system 102, and displays meeting insights based on the data provided to the content management system 102.

Figure 4A:
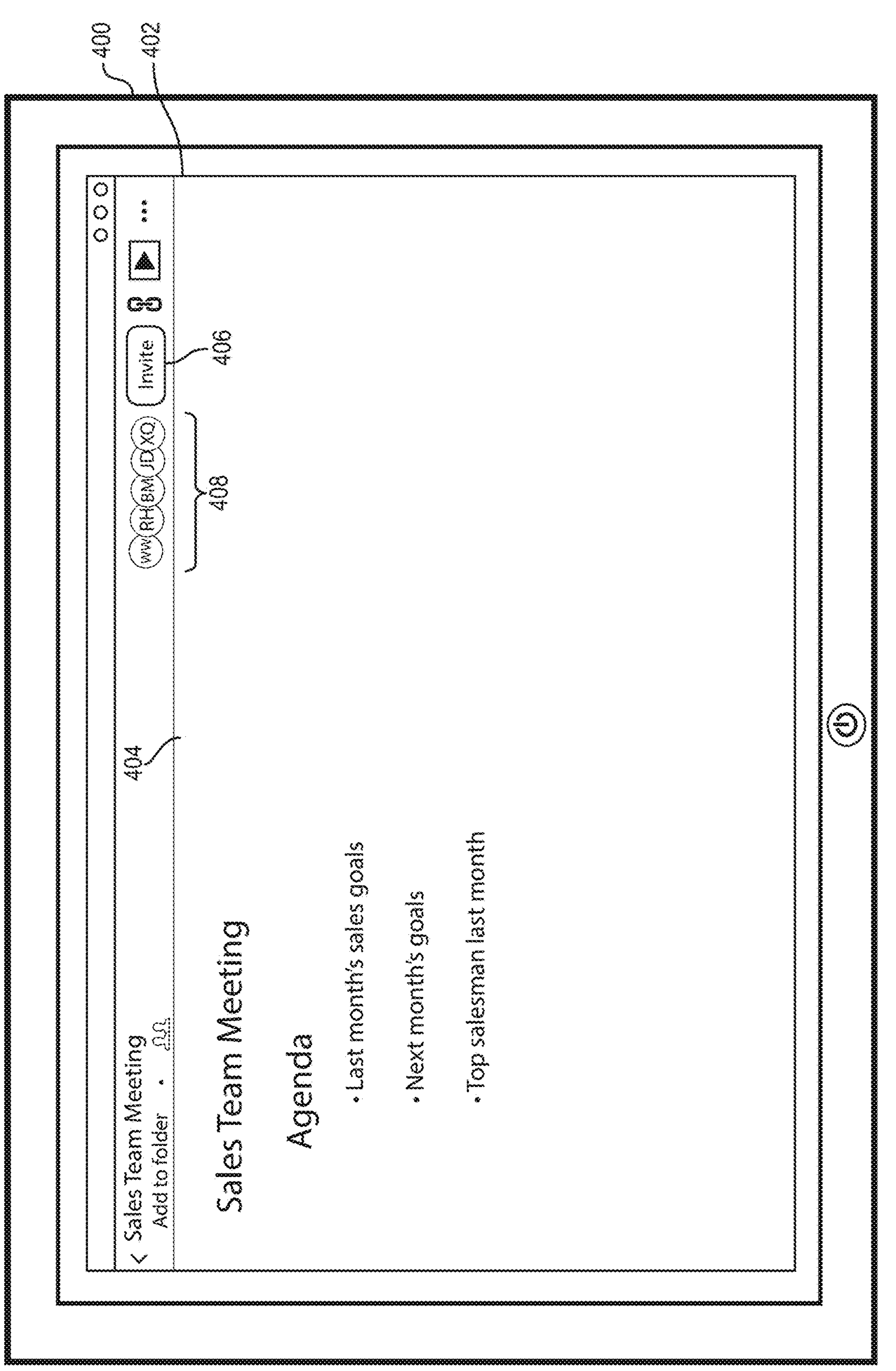
FIGS. 4A-4E illustrate example graphical user interfaces for conducting a meeting and generating meeting insights in accordance with one or more implementations.

FIG. 4A illustrates an embodiment of a client device 400 with a display screen presenting a user interface of a client application 402 associated with the content management system 102. As illustrated in FIG. 4A, the client device 400 is a desktop computing device including the client application 402 that allows the client device 400 to communicate with the content management system 102 and perform content management/creation operations in connection with the content management system 102. In one or more embodiments, the client application 402 includes an interface that allows a user to generate content and store the content in a cloud storage system. For instance, a user can use the client application 402 to generate word processing documents and store the documents in a cloud storage environment (e.g., server(s) 104 of FIG. 1).

The content management system 102 can also allow the user to view and edit content items already stored by the content management system 102. For instance, if the user uses another client device to create a content item, the content management system 102 can synchronize the content item to other client devices associated with the user account. Thus, the content management system 102 can synchronize content with the client device 400 so that the user can view the content and/or edit the content within the client application 402. Additionally, synchronization of content items can occur in real time, so that two or more users can view a content item and modifications/edits to the content item in real time, such as within a browser-based online collaborative application.

As shown, the client application 402 can allow a user to create a content item in connection with a meeting. To illustrate, the user can create a meeting agenda 404 for a meeting involving the user and one or more other users. In particular, the client application 402 can include word processing capabilities to allow the user to create the meeting agenda 404, view the meeting agenda 404, and/or edit the meeting agenda 404. The content management system 102 can synchronize the meeting agenda 404 with other client devices of the user (e.g., a smartphone) so that the user can access the meeting agenda 404 from any device associated with the user's account.

The content management system 102 can also allow the user to share content with other users. For example, the content management system 102 can allow the user to add other users to a list of users that have access to a content item by inviting the users to view and/or edit the content item using an invite option 406. The client application 402 can also display information about the users who are able to see and/or edit the content item (e.g., icons 408). As with the user, the content management system 102 can allow the other users invited to the content item to synchronize the content item across a plurality of devices.

As shown, the meeting agenda 404 can include details about a planned meeting. For example, the meeting agenda 404 can include a title indicating that the content item is an agenda for a specific meeting. The meeting agenda 404 can also include a plurality of bullet points that indicate topics the meeting presenter will discuss during the meeting. In one or more embodiments, a meeting agenda also includes other details about the meeting, including time, location, etc. These details may allow the content management system 102 to determine meeting insights during, or after, the meeting.

The meeting agenda 404 can also include metadata or other data that indicates to the content management system 102 that the meeting agenda 404 corresponds to a scheduled meeting. The content management system 102 can thus associate any data from the meeting with the meeting agenda 404 and other content associated with the meeting. To illustrate, the content management system 102 can associate audio data, video data, documents, device input data, feedback, meeting insights, user identifier, or other data with the meeting agenda 404 and with each other. In one example, the content management system 102 uses a meeting identifier to associate content with the meeting.

Figure 4B:
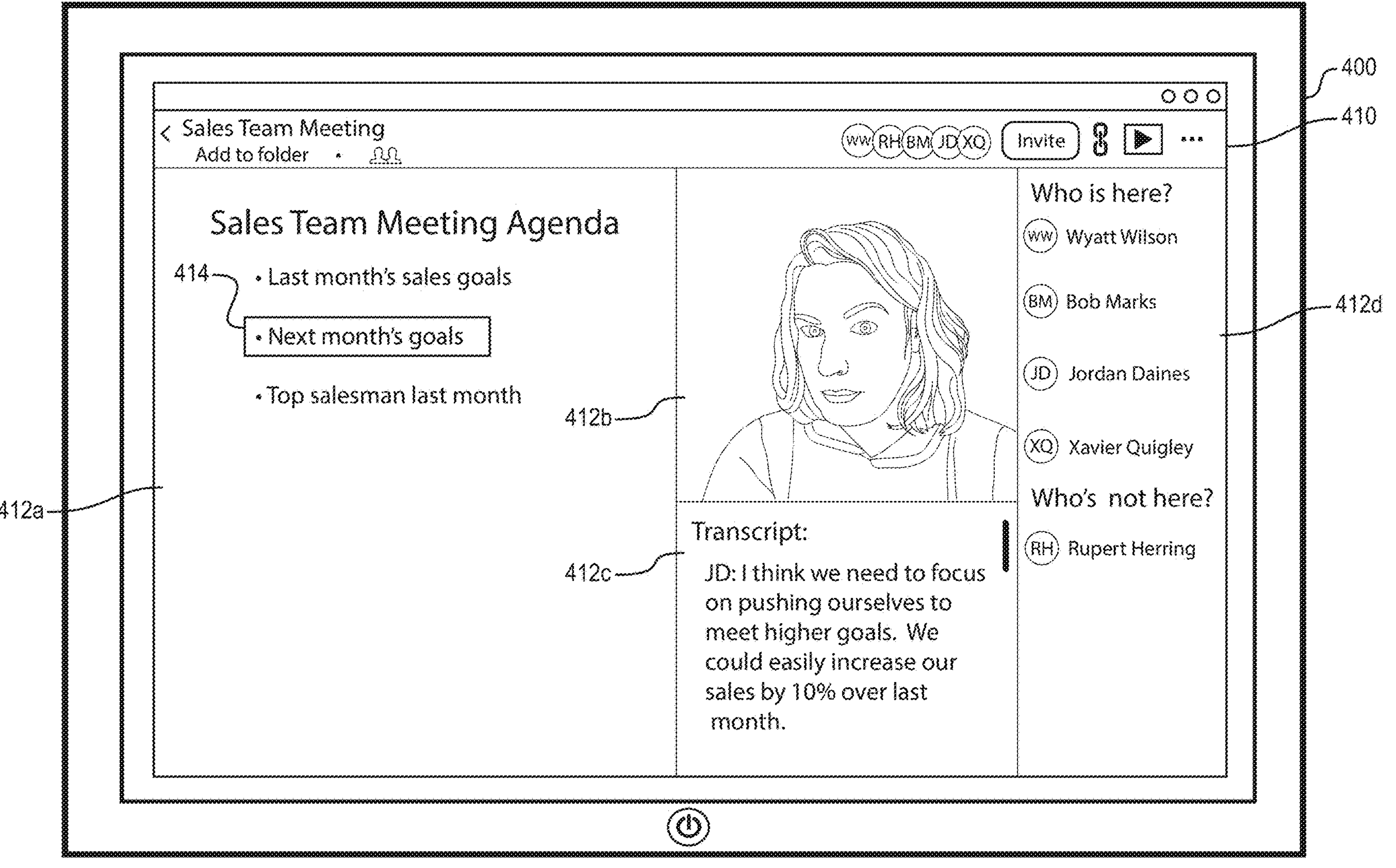

FIG. 4B illustrates a graphical user interface of a client application 410 on the client device 400. The client application 410 may be the same as client application 402 or a different application. The client application 410 includes a conferencing application that allows a plurality of users to hold a meeting in two or more different locations (e.g., not in person) over a network connection. The client application 410 can include a plurality of portions for displaying various content items associated with the meeting. For example, the client application 410 can include a document region 412*a*, a video region 412*b*, a transcript region 412*c*, and a user list 412*d*. The client application 410 can include other regions or other arrangements of the illustrated regions than those shown in FIG. 4B.

As mentioned, the client application 410 can include a document region 412*a* for displaying documents or other content items related to the meeting. For example, the document region 412*a* can display presentation items provided by the meeting presenter or by another user associated with the meeting. When displaying a content item in the document region 412*a*, the content management system 102 can synchronize the content displayed within the document region 412*a* across all of the client devices in the meeting. Alternatively, the content management system 102 can allow a user to select different content to view within the meeting than is displayed to another user.

According to one or more embodiments, the content management system 102 analyzes the content in the document region 412*a* for providing information to the user(s) within the client application 410. Specifically, in the case of a meeting agenda (e.g., meeting agenda 404) displayed within the document region 412*a*, the content management system 102 can analyze the meeting agenda to determine a sequence of topics to be discussed within the meeting. While analyzing the audio data for the meeting, the content management system 102 can determine that the meeting presenter or other users are discussing a given topic listed within the meeting agenda (e.g., using audio processing on the audio data provided to the content management system 102 for the meeting). The content management system 102 can then highlight the identified topic within the document region 412*a* (e.g., with a highlight box 414 or another highlight method).

In one or more embodiments, the content management system 102 allows users to use video conferencing during a meeting. In particular, the content management system 102 can provide a video feed for the meeting to the client device 400, which can display the video feed within the video region 412*b*. In one or more embodiments, the video region 412*b* can display a user currently talking. Alternatively, the video region 412*b* can display a selected video feed from a plurality of available video feeds for the meeting (e.g., in response to a selection by the user within the client application 410). The video region 412*b* can thus include a video feed that changes dynamically based on audio input to client devices or in response to user selection of a video feed. In yet additional implementations, the video region 412*b* is able to display a plurality of video feeds.

Furthermore, the client application 410 can include a transcript region 412*c* that displays a transcript of audio from the meeting. In one or more embodiments, the content management system 102 generates a transcript in real-time while the meeting is ongoing. Specifically, the content management system 102 can use language processing to analyze audio data (e.g., streaming audio data) that the client device 400 or another client device provides to the content management system 102. The transcript region 412*c* provides a text transcription of the audio data for the content management system 102 to analyze. The text transcription can also follow the highlight box 414 within the document region 412*a* and the video within the video region 412*b*. Furthermore, the transcription region 412*c* can allow a user to scroll through the text transcription to see what has been discussed.

The client application 410 can also include a user list 412*d* that includes details about the users in attendance at the meeting. In particular, the content management system 102 can identify a plurality of users invited to the meeting. The content management system 102 can use, for example, the users with access to the document(s) provided for display within the document region 412*a*. Additionally, the content management system 102 can determine user identifiers based on a meeting invite using the client application 410 or another application that shares information with the content management system 102 such as an email application. The user list 412*d* can display the users that are currently in attendance, as well as the users that were invited but are not in attendance.

Figure 4C:
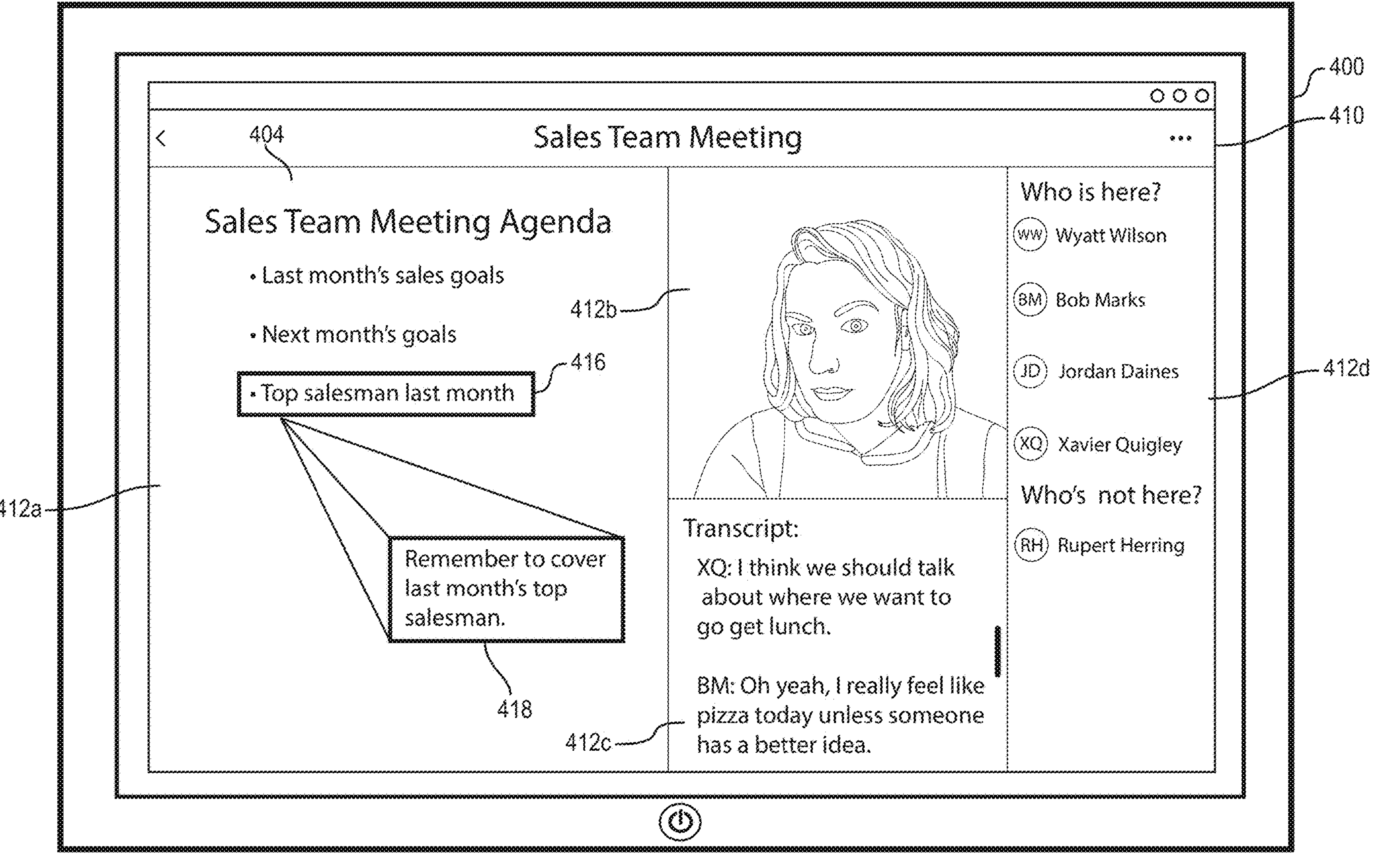

In one or more embodiments, as briefly mentioned previously, the content management system 102 provides real-time meeting moderation. Specifically, the content management system 102 can provide messages to a meeting presenter on a client device of the meeting presenter to assist in presenting the materials or otherwise improving presentation of the meeting. For example, FIG. 4C illustrates an embodiment in which the content management system 102 assists the meeting presenter by verifying that the meeting presenter is covering all of the materials.

As shown, the transcription region 412*c* continues to follow along with the audio data received from one or more client devices (e.g., the client device 400). Furthermore, the content management system 102 analyzes the materials associated with the meeting (e.g., the meeting agenda 404 in the document region 412*a*). As the content management system 102 transcribes the audio data and analyzes the materials associated with the meeting, the content management system 102 can determine when the meeting presenter or another user covers a topic from the meeting agenda 404 and moves to a subsequent topic. As mentioned above, the content management system 102 can highlight a currently or most recently discussed topic within the document region 412*a* using a highlight box 416 to indicate that the current topic has changed, as in FIGS. 4B and 4C.

In one or more embodiments, the content management system 102 tracks the discussed content to determine whether all of the materials are discussed. For example, the content management system 102 can track the topics discussed during the meeting and compare the discussed topics to the meeting materials (e.g., the meeting agenda 404). The content management system 102 can also note the order of discussed topics and determine whether any of the topics are discussed out of order, etc. For instance, if the content management system 102 determines that the meeting presenter has skipped a topic listed in the meeting agenda 404 and moved on to another topic, the content management system 102 can determine that the meeting presenter may have missed the topic.

If the content management system 102 determines that one or more topics from the meeting agenda 404 have not been covered by the meeting presenter or another user during the meeting, the content management system 102 can generate a message to provide to the meeting presenter. To assist the meeting presenter, the content management system 102 can generate a message including a topic, materials, or other content included in the meeting agenda 404 or other meeting materials that the content management system 102 has not found in the audio data. The content management system 102 can provide the message to the meeting presenter within the client application 410 as a popup notification 418, as in FIG. 4C. In one or more alternative embodiments, the content management system 102 provides meeting moderation messages in a messages pane, in a separate interface (e.g., window or application), or on a separate device (e.g., a device also in communication with the content management system 102).

In addition to messages regarding content that has been discussed, the content management system 102 can also provide additional meeting moderation by tracking a time associated with the meeting. For example, the content management system 102 can access details about the meeting (e.g., from a calendar event associated with the meeting or from a meeting invite) to determine a length of scheduled time for the meeting. The content management system 102 can track the time taken for an ongoing meeting and determine whether the meeting is on track to end on time.

To illustrate, the content management system 102 can analyze the meeting agenda 404 to determine whether the meeting is on track based on the percentage of the meeting agenda 404 remaining. For instance, the content management system 102 can assign a planned time for each agenda item based on the total number of items and the amount of time scheduled for the meeting. Alternatively, a user can customize the time for each agenda item by manually setting the times for the agenda items, such as by including the amount of time for each agenda item within the meeting agenda 404. In yet another example, the user can customize the time for each agenda item within the client application 410 during the meeting. If the content management system 102 detects that the meeting is likely to go over time, or that discussion of an agenda item has taken longer than its allotted time, the content management system 102 can provide a message to the meeting presenter indicating the time issue.

Figure 4D:
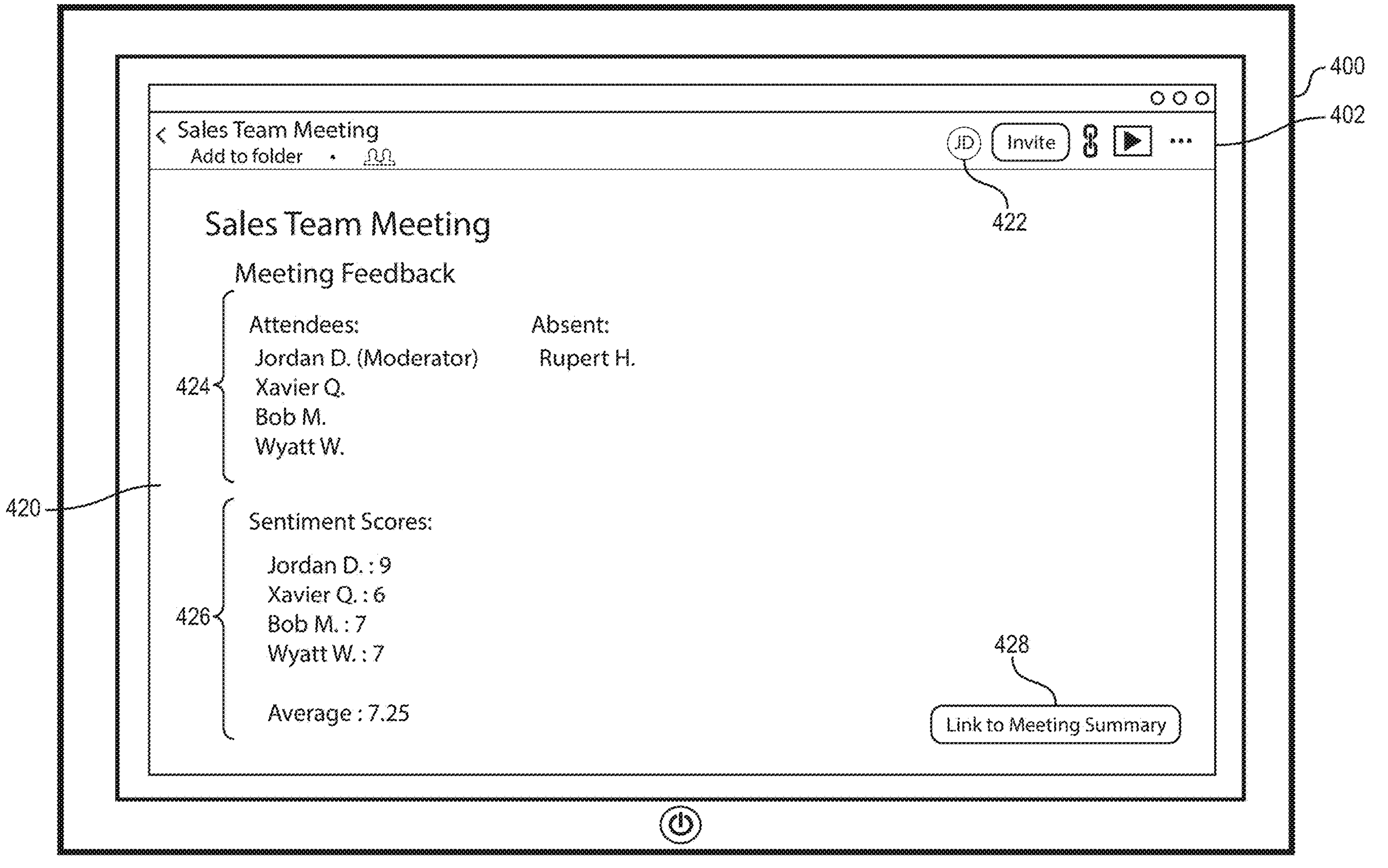

Once a meeting has ended, the content management system 102 can provide additional meeting insights associated with the meeting. In particular, the content management system 102 can provide meeting feedback and meeting summaries based on the meeting data for the meeting and device input data during the meeting. For example, FIG. 4D illustrates a user interface including meeting feedback for a meeting. In particular, the content management system 102 generates meeting feedback based on inputs from one or more client devices associated with one or more users attending the meeting.

In one or more embodiments, the content management system 102 provides a feedback document 420 to the meeting presenter. As shown, the client device 400 can display the feedback document 420 within the client application 402 of FIG. 4A, though the content management system 102 can provide the feedback document 420 for display within another client application. Furthermore, the content management system 102 can provide the feedback document 420 to only the meeting presenter ("Moderator," as in FIG. 4D). Accordingly, the client application 402 can include an indication that the meeting presenter is the only user to have access to the feedback document 420 with the icon 422.

According to one or more embodiments, the content management system 102 generates feedback for the meeting based on inputs to one or more client devices. For example, the content management system 102 can determine whether one or more users invited to a meeting attended the meeting based on information obtained from client device(s) associated with the invited users. To illustrate, the content management system 102 can determine that users who logged into a meeting interface (e.g., the interface described in relation to FIGS. 4B-4C) during the meeting attended the meeting. Similarly, the content management system 102 can determine that users who did not log into the meeting interface during the meeting did not attend the meeting. Once the content management system 102 has determined attendance for the meeting, the content management system 102 can include the attendance 424 in the feedback document 420.

Additionally, the content management system 102 can provide feedback related to meeting effectiveness/productiveness. Specifically, the content management system 102 can determine sentiment scores for users during the meeting as an indication of the meeting effectiveness. For example, the content management system 102 can utilize one or more cues associated with the meeting to determine a sentiment score for a user including, but not limited to explicit user feedback based on a user response to questions or other user input explicitly indicating the user's sentiment and implied user feedback based on video cues, audio cues, biometric data, or inferences from user inputs at their client devices (e.g., based on a user accessing other applications on a client device during the meeting). The content management system 102 can generate sentiment scores 426 including a sentiment score for each user and an averaged sentiment score for all users and then provide the sentiment scores 426 in the feedback document 420.

Figure 4E:
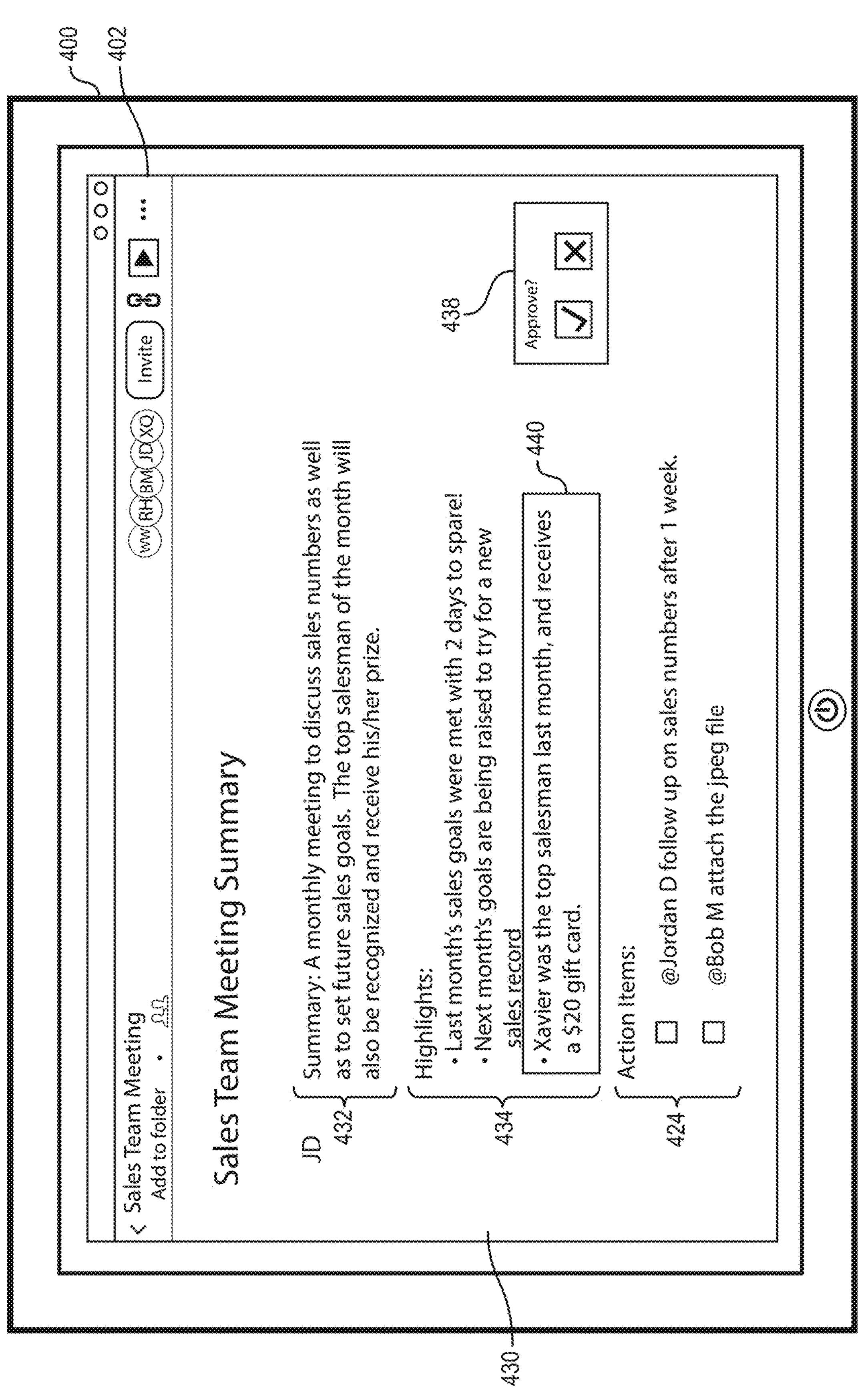

In addition to providing meeting feedback, the content management system 102 can provide a meeting summary to one or more users. FIG. 4D illustrates a summary option 428 within the feedback document 420 to view the meeting summary associated with the meeting. Selecting the summary option 428 can cause the client application 402 to display the corresponding meeting summary within the meeting interface, as illustrated in FIG. 4E. Alternatively, the content management system 102 can allow a user to access the meeting summary from a directory of content items associated with the user's account with the content management system 102.

As illustrated in FIG. 4E, the content management system 102 can provide a meeting summary 430 with additional meeting insights from the meeting. In one or more embodiments, the meeting summary 430 includes an overall summary 432, highlights 434, and action items 436. To illustrate, the overall summary 432 can include a summary of the purpose of the meeting. The content management system 102 can obtain the purpose of the meeting by extracting it from a meeting invite, from an agenda or other presentation materials, from a calendar event, or by using machine-learning to generate the summary based on the content of the audio data as a whole.

Additionally, the highlights 434 can include important/notable points discussed during the meeting. Specifically, the content management system 102 can analyze the audio data to determine content of the audio data (e.g., text transcription). The content management system 102 can then monitor inputs to client devices during the meeting to determine portions of the audio data that may be relevant based on the amount and/or type of input to the client devices. As previously mentioned, the content management system 102 can determine that a portion of audio data is relevant in response to detecting that one or more users have provided a touch/tap input or a motion input to a client device based on data from the client device's accelerometer/gyroscope.

In one or more additional embodiments, the content management system 102 detects that one or more users are taking notes during one or more portions of media data, indicating that those portions include important information. For example, the content management system 102 can determine relevant portions in response to detecting that any user is taking notes (e.g., typing while using a word processing or note-taking application, writing on a piece of paper, or using another note-taking medium). Alternatively, the content management system 102 can determine whether a threshold percentage of users is taking notes at any given time for identifying relevant portions of a meeting (e.g., based on meeting heuristics), which may help verify the importance of the portion of a meeting. As will be discussed in more detail below with respect to FIGS. 5A-5B, the content management system 102 can identify relevant portions generally or per individual.

According to one or more embodiments, the content management system 102 uses video data to determine whether a portion of a meeting is relevant. In particular, the content management system 102 can use video cues such as body language (facial expressions), eye movements (e.g., a wink), body movements (e.g., head nod, hand movements such as a thumbs up), or other body cues (e.g., touching a predetermined section of a table or area near a user labeled with physical or digital markers) to determine that a portion of the meeting is relevant to that user or to other users. The content management system 102 can synchronize the video data with audio data for the meeting to identify the portions of the meeting corresponding to the video cues that indicated relevant information.

The content management system 102 can use audio transcription text corresponding to the relevant portion(s) of the meeting. For instance, the content management system 102 can use a text transcription of audio data that the content management system 102 generated during or after the meeting. The content management system 102 can then identify the text corresponding to the relevant portions and paste the text or summarize/rephrase the text into the meeting summary 430 as highlights 434. The highlights 434 can include bullet points or other easily digestible representations of the discussion points from the meeting.

In one or more embodiments, determining the text to include in the highlights 434 includes reviewing the text corresponding to the relevant portions to determine how much of the text is included in the relevant portion. Specifically, when the content management system 102 detects a device input, the content management system 102 can review the portion of the audio data at the time of the device input. The content management system 102 can also review text chronologically near the time of the device input to determine whether the relevant portion includes a sentence, two sentences, a paragraph, the past twenty seconds of audio, the past thirty seconds of audio, etc., to determine the relevant portion of the audio data corresponding to the device input.

Similar to determining the highlights 434, the content management system 102 can determine the action items 436 based on meeting data and device input data. The content management system 102 can determine, for instance, that one or more users provides input to a touch screen, keyboard (e.g., notes, keyboard shortcut), or microphone (e.g., voice command) to mark a portion of the audio data or other meeting materials as relevant (e.g., in metadata of the audio data or other content items). The content management system 102 can determine that the relevant portion includes an operation or action for one or more users to perform based on the meeting using key words, phrases, or other indicators of operations/actions. The content management system 102 can then generate an action item by including the action to perform in the meeting summary 430. The content management system 102 can also tag one or more users in relation to an action item so that the action item is associated with the tagged user(s), and which may provide notifications/reminders of the action item at a later time.

When determining relevance of highlights or action items for one or more users, the content management system 102 can assign a confidence to each potential highlight/action item in the meeting data. For example, the content management system 102 can use information about past highlights/action items, including whether users reviewed or completed the highlights/action items, to determine a confidence level for highlights/action items in the present meeting data. If the confidence for a given item meets a threshold, the content management system 102 can include the item in the meeting summary 430. Additionally, the content management system 102 can use confidence levels and past execution/review of items to prioritize similar items within the meeting summary 430. This can be particularly helpful in regularly occurring meetings dealing with review cycles, product launches, or other meetings that regularly include the same or similar action items.

In one or more embodiments, the meeting summary 430 provided to the meeting presenter is a provisional meeting summary that allows the meeting presenter to approve or reject meeting insights prior to providing meeting insights to other users. In particular, the content management system 102 can provide an approval option 438 with each item in the meeting summary 430 to allow the user to approve or reject each item. For example, if the user hovers over an item (e.g., a highlight) within the client application 402, the client application can display the approval option 438 and present the highlight with a highlight box 440 indicating that the approval option 438 corresponds to the indicated highlight. Accordingly, the user can verify the accuracy of the highlight to the content management system 102 by selecting to approve (check mark) or reject ("x") the highlight and whether to include the highlight in meeting highlights provided to other users. After verifying the accuracy of the meeting summary 430, the content management system 102 can provide meeting insights to other users associated with the meeting.

While FIGS. 4A-4E illustrate meeting moderation and/or feedback provided to a meeting presenter, the content management system 102 can provide meeting moderation and/or feedback to other users, as may serve a particular implementation. For instance, the content management system 102 can determine that meeting moderation notifications or feedback can assist other users in improving a meeting, or future meetings, by presenting the information to other users in addition to the meeting presenter. The content management system 102 may determine whether to send such information to other users based on preferences of the meeting presenter and/or based on historical operations during past meetings.

For example, the content management system 102 can utilize information that is discussed during a meeting to provide real-time feedback or insight to attendees of a meeting. Specifically, the content management system 102 can detect keywords, phrases, or other content in a meeting and then take an action to display insights on one or more client devices associated with the meeting. To illustrate, in response to detecting an acronym being discussed during a meeting, the content management system 102 can identify a meaning of the acronym and then provide a message to one or more client devices including the identified meaning of the acronym. The content management system 102 can similarly provide real-time insights that include other information for individuals, groups, or other entity based on the context of the audio data or other meeting materials. For instance, the content management system 102 can detect when a user requests that the content management system 102 provide business intelligence information (e.g., performance statistics, asset information, planning information) to one or more client devices and/or one or more user accounts associated with the meeting.

In one or more embodiments, the content management system 102 also provides suggestions to one or more users (e.g., to the meeting presenter) to send meeting materials (summaries or other content items) to the one or more users or for including users in future meetings. In particular, the content management system 102 can identify users who may be interested in the meeting materials based on attendees/invitees associated with the meeting. The content management system 102 can determine user interest based on identifying that a user during the meeting is discussing a content item with another user during the meeting. The content management system 102 can also identify users who may be interested in meeting materials based on user account info, users in specific departments, subject matter of the meeting materials, participation in previous meetings, or other indicators of a correlation between the meeting subject matter and the users. The content management system 102 can also use machine-learning to determine potential user interest in meeting materials. Once the content management system 102 has determined users who may be interested, the content management system 102 can provide suggestions to the meeting presenter or to another user for sharing materials.

In one or more embodiments, as mentioned previously, the content management system 102 uses the feedback from the user to train a machine-learning model. Specifically, the feedback from the user can act as curation of the input data or training data to the machine-learning model so that the machine-learning model can generate more accurate insights for future meetings. For instance, based on the user feedback and the text content of the corresponding portion of audio data, the content management system 102 can treat similar content in audio data for future meetings consistently with the user feedback.

Figures 5A, 5B:
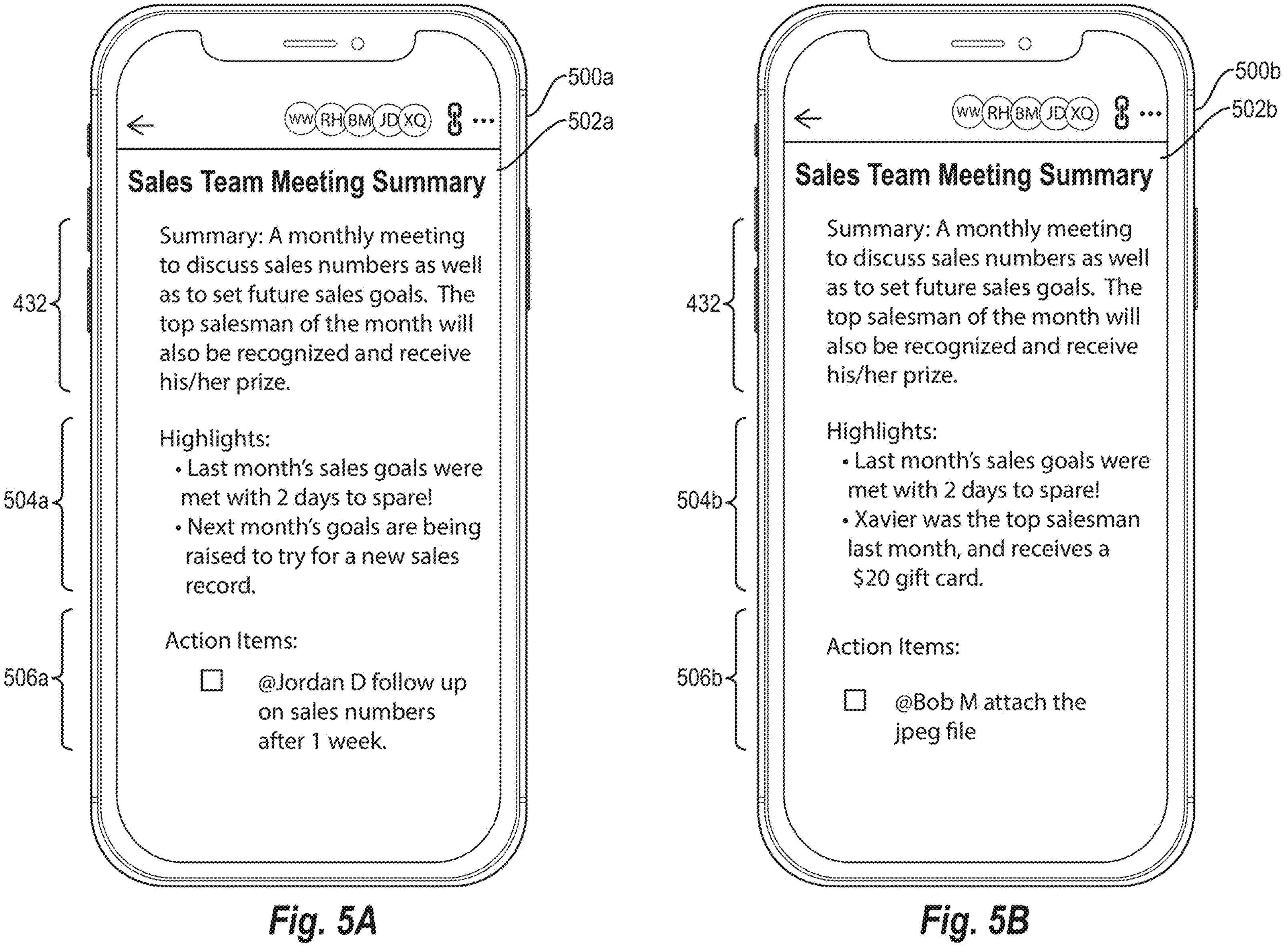
FIGS. 5A-5B illustrate example graphical user interfaces for providing customized meeting summaries in accordance with one or more implementations.

Additionally, the content management system 102 can provide customized meeting summaries to users based on information that is relevant to each specific user. FIGS. 5A-5B illustrate embodiments of graphical user interfaces displaying customized meeting summaries based on the meeting summary 430 of FIG. 4E. For example, FIG. 5A illustrates a first client device 500*a* displaying a first customized meeting summary 502*a* for a first user. Similarly, FIG. 5B illustrates a second client device 500*b* displaying a second customized meeting summary 502*b* for a second user. In each case, the content management system 102 identifies meeting insights that are relevant to each user and provides the corresponding relevant meeting insights in the separate customized meeting summaries.

As mentioned, FIG. 5A illustrates a first customized meeting summary 502*a* for a first user. As shown, the first customized meeting summary 502*a* includes the overall summary 432 from the meeting summary 430 of FIG. 4E. While the overall summary 432 is the same as in the meeting summary 430, the content management system 102 can determine that only a subset 504*a* of all highlights is relevant to the first user. Specifically, the content management system 102 can determine that the subset 504*a* of highlights is relevant based on device input from the first client device 500*a* (e.g., based on the user tapping or typing on the first client device 500*a* during the corresponding portions of a meeting). Additionally, the content management system 102 can determine the subset 504*a* of highlights based on user account information for the user, including, but not limited to the user's job description and the subject matter of the portion(s) of the meeting or previous meetings involving the first user.

Furthermore, the content management system 102 can determine a subset 506*a* of action items relevant to the first user to include in the first customized meeting summary 502*a*. In particular, the content management system can utilize device input data, audio data (or other meeting data), and user account information to determine which action items are relevant to the user. In addition, the content management system 102 can determine that the subset 506*a* of action items is relevant to the user based on the action items including a tag of the user (e.g., "@Jordan D"). The content management system 102 can then include the subset 506*a* of action items relevant to the user within the first customized meeting summary 502*a* for display at the first client device 500*a*.

FIG. 5B illustrates a second customized meeting summary 502*b* for a second user. As shown, the second customized meeting summary 502*b* includes the overall summary 432 from the meeting summary 430 of FIG. 4E, as with the first customized meeting summary 502*a*. The content management system 102 can determine that only a subset 504*b* of all highlights is relevant to the second user. Specifically, the content management system 102 can determine that the subset 504*b* of highlights is relevant based on device input from the second client device 500*b* (e.g., based on the user tapping or typing on the second client device 500*b* during the corresponding portions of meeting data). Additionally, the content management system 102 can determine the subset 504*b* of highlights based on user account information for the user, including, but not limited to the user's job description and the subject matter of the portion(s) of the meeting data or previous meetings involving the second user.

Furthermore, the content management system 102 can determine a subset 506*b* of action items relevant to the second user to include in the second customized meeting summary 502*b*. In particular, the content management system can utilize device input data, meeting data, and user account information to determine which action items are relevant to the user. In addition, the content management system 102 can determine that the subset 506*b* of action items is relevant to the user based on the action items including a tag of the user (e.g., "@Bob M"). The content management system 102 can then include the subset 506*b* of action items relevant to the user within the first customized meeting summary 502*b* for display at the second client device 500*b*.

As shown in FIG. 5B, summary documents can also allow users to add content to the meeting summaries. For example, an action item within the second customized meeting summary 502*b* includes a request for the second user to attach a file to the second customized meeting summary 502*b*. To complete the action item, the second user can attach a corresponding file (e.g., a picture) to the second customized meeting summary 502*b*. The content management system 102 can then synchronize the attachment to the summaries of other users for which the attachment is relevant (e.g., based on the other users including a similar action item, highlight, or other insight).

Because the content management system 102 is able to generate generalized or customized summaries of meeting data, the content management system 102 can make these summary documents searchable within a cloud storage associated with one or more user accounts. For instance, the content management system 102 can store meeting summaries with users who attended a meeting so that each of the users can search within their online storage accounts to find content of the meeting summaries. Thus, when a user wants to find relevant information from a previous meeting, the user can leverage the content management system 102 to easily search for summaries, highlights, or action items that the content management system 102 determined were relevant to the user.

Additionally, the content management system 102 can index a user's content items to automatically provide reminders and other notifications to the user based on past meetings. For instance, the content management system 102 can analyze action items in meeting summaries associated with the user and then generate reminders (or other content items) or schedule follow-up meetings to complete the action items according to a timetable indicated during the meeting (if applicable). The content management system 102 can also allow the user to clear any action items that the user has completed so that the content management system 102 will mark them as completed and not provide any further notifications/reminders. In at least some embodiments, the content management system 102 can automatically complete certain action items involving generating content items, scheduling additional meetings, sending content items to one or more users, or other actions that the content management system 102 can perform.

In addition to providing meeting insights to users via applications managed by the content management system 102, the content management system 102 can provide meeting insights (e.g., one or more electronic messages) to a user via a third-party system. For instance, the content management system 102 can allow a user to authenticate a third-party application with the content management system 102 (e.g., using login credentials for the third-party system). When the content management system 102 identifies meeting content relevant to the user, the content management system 102 can generate one or more electronic messages to send to the user via the third-party application. To illustrate, the content management system 102 can automatically push action items corresponding to a user based on a recent meeting to a client device of the user via the third-party application.

Figure 6:
FIG. 6 illustrates a flowchart of a series of acts for generating meeting insights based on meeting data and client device inputs in accordance with one or more embodiments.
Figure 6:
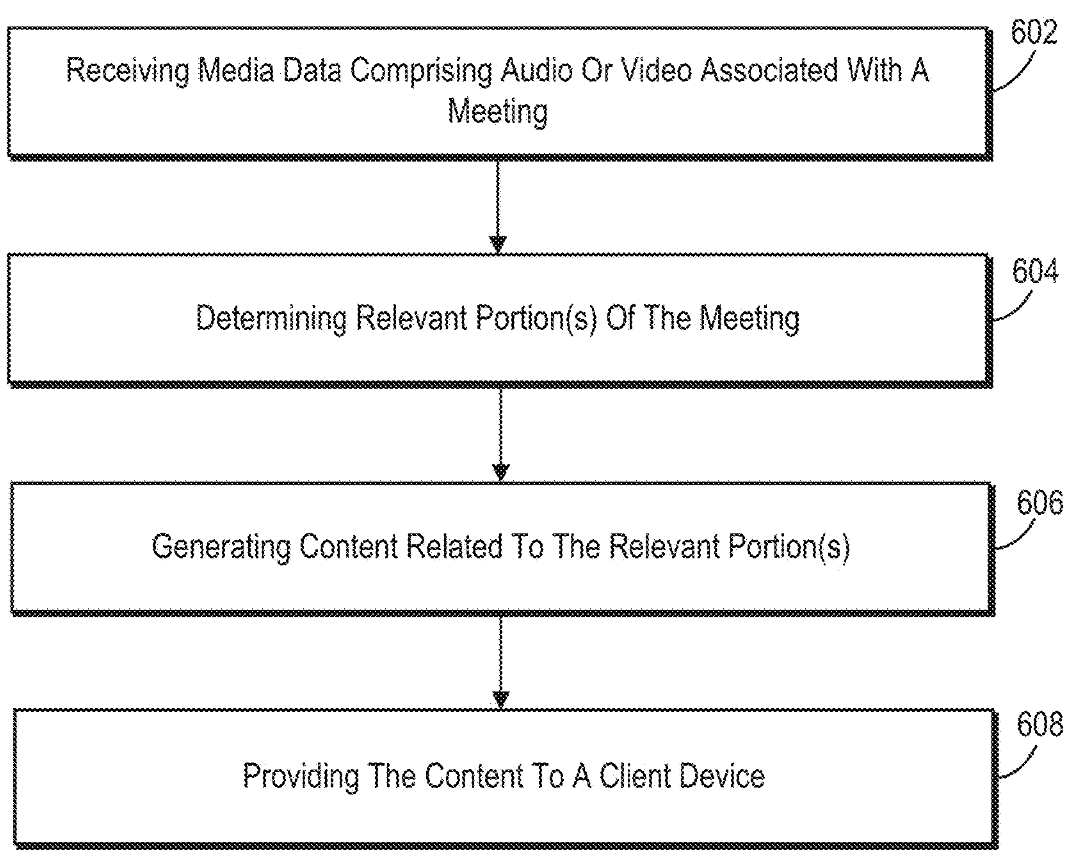

Turning now to FIG. 6, this figure illustrates a flowchart of a series of acts 600 of generating meeting insights from media data and device input data in accordance with one or more embodiments. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable medium can comprise instructions, that when executed by one or more processors, cause a computing device to perform the acts of FIG. 6. In still further embodiments, a system can perform the acts of FIG. 6.

The series of acts 600 includes an act 602 of receiving media data comprising audio or video associated with a meeting. For example, act 602 involves receiving, by a digital content management system, media data from one or more client devices, the audio data comprising at least one of audio or video associated with a meeting. The media data can include audio recorded by the one or more client devices during the meeting in connection with a client application associated with the digital content management system.

The series of acts 600 also includes an act 604 of determining relevant portion(s) of the meeting. For example, act 604 involves analyzing, by the digital content management system, the media data and one or more user inputs detected by one or more client devices during the meeting to determine one or more relevant portions of the meeting. For instance, act 604 can involve determining a portion of the media data that includes an action item for the user to perform based on at least one of a timing of a detected user input by the user, a mention of the user in the media data, or one or more comments made by the user in the media data. Act 604 can also involve determining a portion of the audio data that includes information for the user to review at a later time. For example, the one or more relevant portions of the meeting can comprise portions of media data specific to the user or marked as important by the user.

Act 604 can involve identifying a user input detected by a client device of the one or more client devices and determining a timing of the detected user input. Act 604 can then involve determining a portion of the media data corresponding to the timing of detected user input. Act 604 can then involve analyzing the portion of the media data corresponding to the timing of detected user input. The detected user input can include a touch input at the client device detected by an accelerometer during the meeting, a gesture or movement by a user detected by an image capture device of the client device during the meeting, or an audio indicator detected by a microphone device of the client device to mark a corresponding portion of the meeting as important to the user. Additionally, the one or more user inputs detected by the one or more client devices can include data from a touch screen, a mouse, a keyboard, or a biometric sensor of the one or more client devices.

Act 604 can involve identifying a plurality of user inputs detected by a plurality of client devices at an identified time of the meeting, the plurality of user inputs comprising keyboard inputs indicating that a plurality of attendees of the meeting are taking notes at the identified time. Act 604 can further involve determining a portion of the media data or materials for the meeting corresponding to the identified time, the materials comprising one or more content items presented during the meeting or generated during the meeting.

Act 604 can involve analyzing the media data using natural language processing to detect a word or phrase in the audio indicating information relevant to the user associated with the meeting. Act 604 can then involve determining a portion of the media data corresponding to the detected word or phrase and generating content related to the portion of the media data corresponding to the detected word or phrase.

Act 604 can also involve analyzing materials for the meeting comprising one or more content items presented during the meeting or generated during the meeting. For example, act 604 can involve analyzing text documents, video data, images, or slides associated with the meeting to determine one or more portions of the materials that are relevant to one or more users.

As part of act 604, or as an additional act, the series of acts 600 can include analyzing the media data using natural language processing to determine a context of the meeting. The series of acts 600 can then include selecting the user from a plurality of users based on a user profile of the user including information associated with the context of the meeting.

Additionally, the series of acts 600 includes an act 606 of generating content related to the relevant portion(s) of the meeting. For example, act 606 involves generating, by the digital content management system in response to determining the one or more relevant portions of the meeting, content related to the one or more relevant portions of the meeting. Act 606 can also involve generating a summary of the one or more relevant portions of the media data. Act 606 can involve generating customized summaries for a plurality of users based on different relevant portions of the media data for the plurality of users.

Furthermore, the series of acts 600 includes an act 608 of providing the content to a client device. For example, act 608 involves providing, by the digital content management system, the content related to the one or more relevant portions of the meeting to a client device of a user associated with the meeting. Act 608 can involve providing a notification including meeting moderation insights for display within a client application of a meeting presenter during the meeting.

The series of acts 600 can also include training a machine-learning model using a training dataset comprising media data and generated content associated with one or more meetings. Additionally, the series of acts 600 can include utilizing the trained machine-learning model to generate the content related to the one or more relevant portions of the media data. The series of acts 600 can then include generating one or more electronic messages to send to one or more client devices of the one or more users associated with the second meeting.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
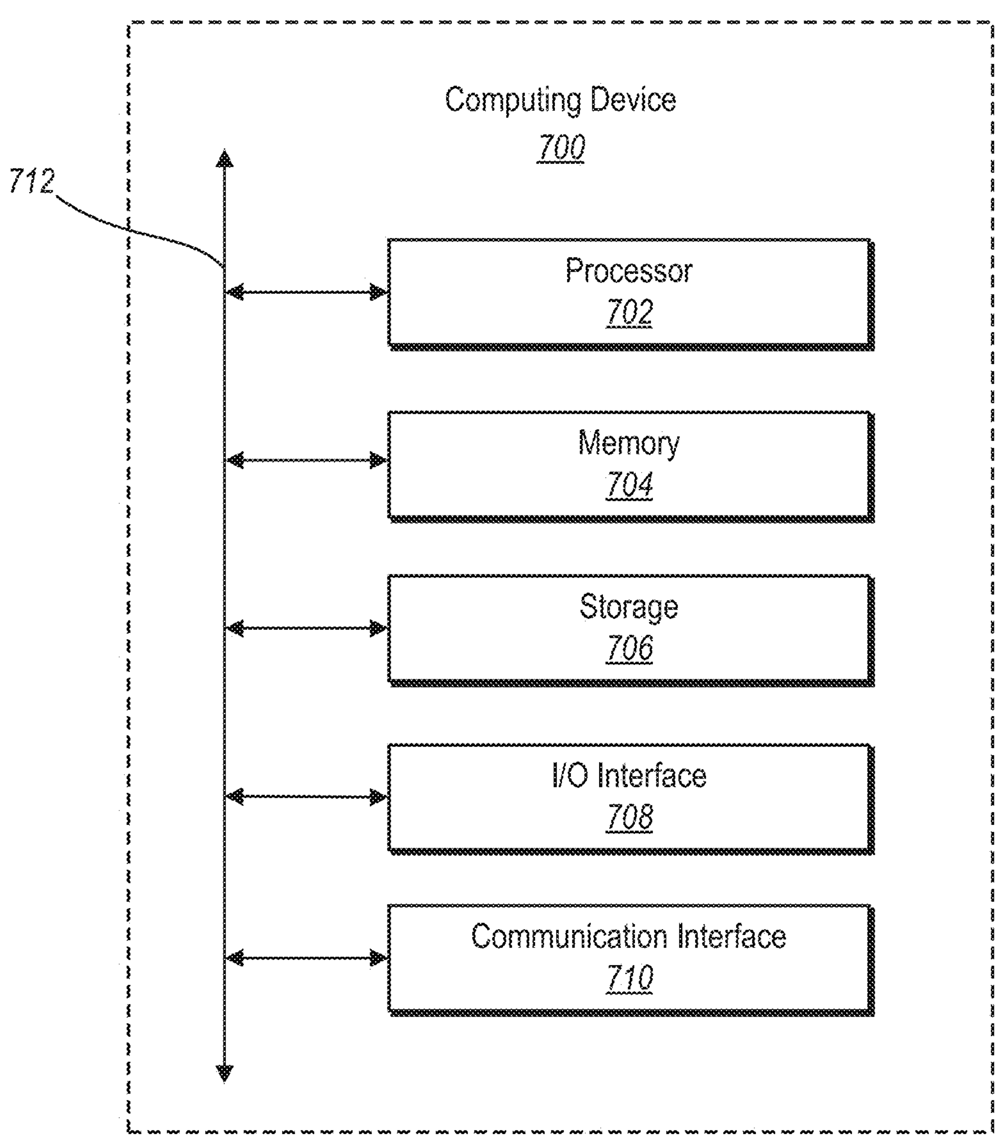
FIG. 7 illustrates a block diagram of a computing device in accordance with one or more embodiments.

FIG. 7 illustrates a block diagram of exemplary computing device 700 that may be configured to perform one or more of the processes described above. One will appreciate that client devices described herein and/or the content management system 102 may comprise one or more computing devices such as computing device 700. As shown by FIG. 7, computing device 700 can comprise processor 702, memory 704, storage device 706, I/O interface 708, and communication interface 710, which may be communicatively coupled by way of communication infrastructure 712. While an exemplary computing device 700 is shown in FIG. 7, the components illustrated in FIG. 7 are not intended to be limiting. Additional or alternative components may be used in other embodiments. Furthermore, in certain embodiments, computing device 700 can include fewer components than those shown in FIG. 7. Components of computing device 700 shown in FIG. 7 will now be described in additional detail.

In particular embodiments, processor 702 includes hardware for executing instructions, such as those making up a computer program. As an example, and not by way of limitation, to execute instructions, processor 702 may retrieve (or fetch) the instructions from an internal register, an internal cache, memory 704, or storage device 706 and decode and execute them. In particular embodiments, processor 702 may include one or more internal caches for data, instructions, or addresses. As an example and not by way of limitation, processor 702 may include one or more instruction caches, one or more data caches, and one or more translation lookaside buffers (TLBs). Instructions in the instruction caches may be copies of instructions in memory 704 or storage 706.

Memory 704 may be used for storing data, metadata, and programs for execution by the processor(s). Memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 704 may be internal or distributed memory.

Storage device 706 includes storage for storing data or instructions. As an example and not by way of limitation, storage device 706 can comprise a non-transitory storage medium described above. Storage device 706 may include a hard disk drive (HDD), a floppy disk drive, flash memory, an optical disc, a magneto-optical disc, magnetic tape, or a Universal Serial Bus (USB) drive or a combination of two or more of these. Storage device 706 may include removable or non-removable (or fixed) media, where appropriate. Storage device 706 may be internal or external to computing device 700. In particular embodiments, storage device 706 is non-volatile, solid-state memory. In other embodiments, Storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 708 allows a user to provide input to, receive output from, and otherwise transfer data to and receive data from computing device 700. I/O interface 708 may include a mouse, a keypad or a keyboard, a touch screen, a camera, an optical scanner, network interface, modem, other known I/O devices or a combination of such I/O interfaces. I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 708 is configured to provide graphical data to a display for presentation to a user. The graphical data may be representative of one or more graphical user interfaces and/or any other graphical content as may serve a particular implementation.

Communication interface 710 can include hardware, software, or both. In any event, communication interface 710 can provide one or more interfaces for communication (such as, for example, packet-based communication) between computing device 700 and one or more other computing devices or networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 712 may include hardware, software, or both that couples components of computing device 700 to each other. As an example and not by way of limitation, communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 8:
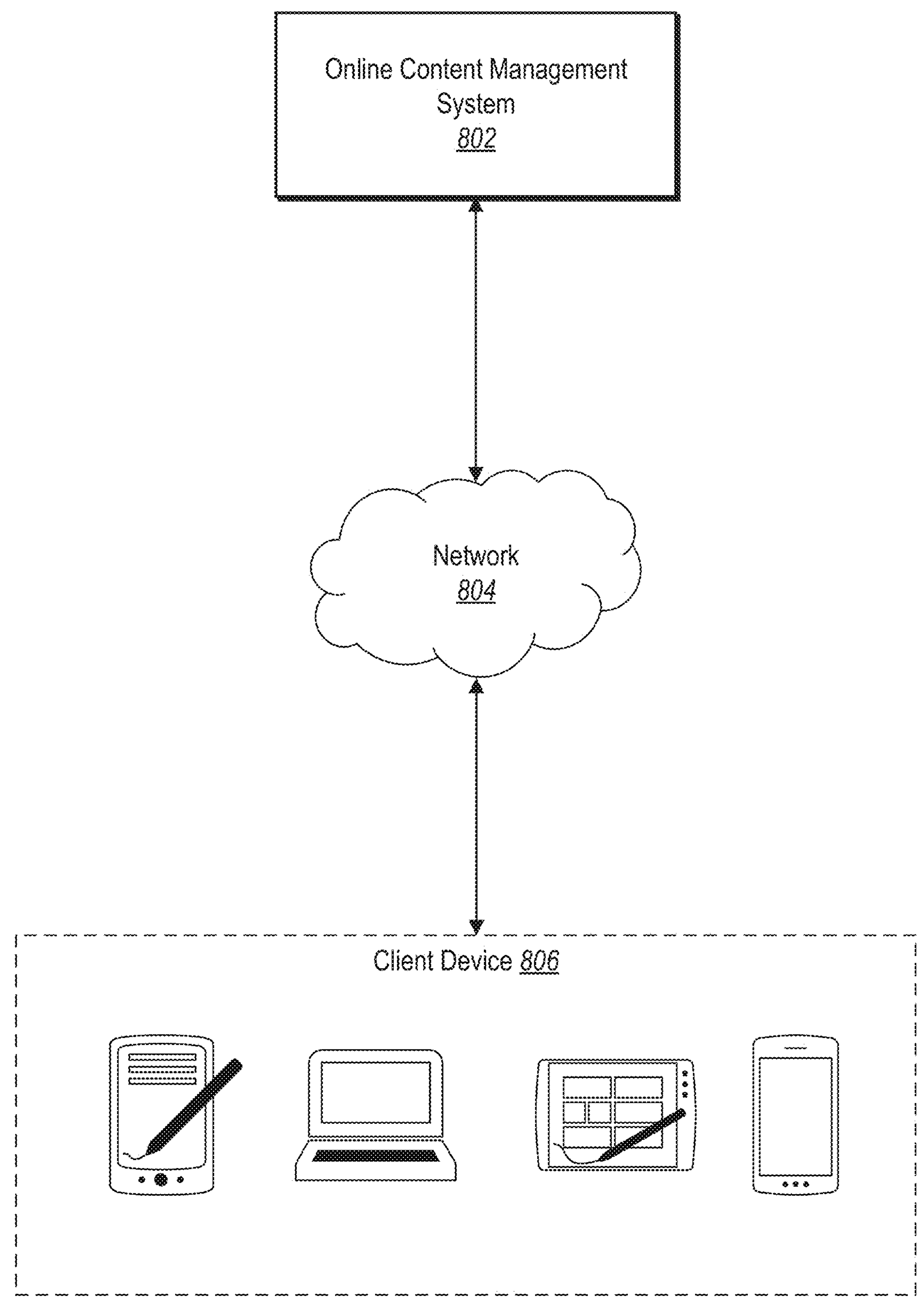
FIG. 8 illustrates a networking environment of an online content management system in accordance with one or more embodiments.

FIG. 8 is a schematic diagram illustrating an environment within which one or more embodiments of system 102 can be implemented. Online content management system 802 may generate, store, manage, receive, and send digital content (such as digital videos). For example, online content management system 802 may send and receive digital content to and from client devices 806 by way of network 804. In particular, online content management system 802 can store and manage a collection of digital content. Online content management system 802 can manage the sharing of digital content between computing devices associated with a plurality of users. For instance, online content management system 802 can facilitate a user sharing a digital content with another user of online content management system 802.

In particular, online content management system 802 can manage synchronizing digital content across multiple client devices 806 associated with one or more users. For example, a user may edit digital content using client device 806. The online content management system 802 can cause client device 806 to send the edited digital content to online content management system 802. Online content management system 802 then synchronizes the edited digital content on one or more additional computing devices.

In addition to synchronizing digital content across multiple devices, one or more embodiments of online content management system 802 can provide an efficient storage option for users that have large collections of digital content. For example, online content management system 802 can store a collection of digital content on online content management system 802, while the client device 806 only stores reduced-sized versions of the digital content. A user can navigate and browse the reduced-sized versions (e.g., a thumbnail of a digital image) of the digital content on client device 806. In particular, one way in which a user can experience digital content is to browse the reduced-sized versions of the digital content on client device 806.

Another way in which a user can experience digital content is to select a reduced-size version of digital content to request the full- or high-resolution version of digital content from online content management system 802. In particular, upon a user selecting a reduced-sized version of digital content, client device 806 sends a request to online content management system 802 requesting the digital content associated with the reduced-sized version of the digital content. Online content management system 802 can respond to the request by sending the digital content to client device 806. Client device 806, upon receiving the digital content, can then present the digital content to the user. In this way, a user can have access to large collections of digital content while minimizing the amount of resources used on client device 806.

Client device 806 may be a desktop computer, a laptop computer, a tablet computer, a personal digital assistant (PDA), an in- or out-of-car navigation system, a handheld device, a smartphone or other cellular or mobile phone, or a mobile gaming device, other mobile device, or other suitable computing devices. Client device 806 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 804.

Network 804 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 806 may access online content management system 802.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:

receiving, from a video conference system and at a content management system, meeting data corresponding to an online meeting hosted by the video conference system;

generating relevance information indicating correlations between the meeting data and content items stored within the content management system for an account associated with the online meeting by processing, utilizing a trained machine-learning model, the meeting data together with text or metadata associated with the content items;

identifying, by the content management system based on the relevance information, a content item previously stored within the content management system that is relevant to the online meeting;

generating a content item suggestion that includes a reference to the content item; and providing the content item suggestion to at least one participant client device associated with the online meeting hosted by the video conference system.

2. The computer-implemented method as recited in claim 1, further comprising:

receiving audio data as part of the meeting data corresponding to the online meeting hosted by the video conference system;

processing the audio data to generate a transcription for the online meeting; and analyzing the transcription using the trained machine-learning model to identify the content item stored within the content management system.

3. The computer-implemented method as recited in claim 1, wherein providing the content item suggestion to the at least one participant client device comprises providing the content item suggestion to each participant client device associated with the online meeting.

4. The computer-implemented method as recited in claim 1, wherein providing the content item suggestion to the at least one participant client device associated with the online meeting comprises providing the content item suggestion to a subset of participant client devices associated with the online meeting.

5. The computer-implemented method as recited in claim 1, further comprising:

transcribing audio data from the meeting data corresponding to the online meeting to generate a transcription;

accessing an agenda content item from the meeting data corresponding to the online meeting;

analyzing the transcription to determine a current topic in the agenda content item is being discussed; and providing an indication of the current topic within the online meeting.

6. The computer-implemented method as recited in claim 1, further comprising:

generating, after a conclusion of the online meeting, a meeting summary based on analyzing the meeting data corresponding to the online meeting; and including the reference to the content item from the content item suggestion on the meeting summary.

7. The computer-implemented method as recited in claim 1, further comprising:

accessing an agenda content item from the meeting data corresponding to the online meeting, the agenda content item comprising a plurality of agenda items;

identifying a planned time for each agenda item of the plurality of agenda items based on a scheduled start time and a scheduled end time for the online meeting; and providing, during the online meeting, a message to the at least one participant client device associated with the online meeting based on determining a remaining planned time for a remaining set of agenda items is greater than a remaining scheduled time based on the scheduled end time for the online meeting.

8. A non-transitory computer readable storage medium comprising instructions that, when executed by at least one processor, cause a computer device to:

receive, from a video conference system and at a content management system, meeting data corresponding to an ongoing online meeting hosted by the video conference system;

generating relevance information indicating correlations between the meeting data and content items stored within the content management system for an account associated with the ongoing online meeting by processing, utilizing a trained machine-learning model, the meeting data together with text or metadata associated with the content items;

identify, by the content management system based on the relevance information, a content item previously stored within the content management system that is relevant to the ongoing online meeting;

generating a content item suggestion that includes a reference to the content item; and providing the content item suggestion to the video conference system hosting the ongoing online meeting.

9. The non-transitory computer readable storage medium as recited in claim 8, wherein:

the meeting data comprises audio data from the ongoing online meeting; and the non-transitory computer readable storage medium further comprising further comprising instructions that, when executed by the at least one processor, cause the computer device to:

generate a transcription for the ongoing online meeting based on processing the audio data from the ongoing online meeting; and analyze the transcription to identify the content item stored within the content management system.

10. The non-transitory computer readable storage medium as recited in claim 8, wherein providing the content item suggestion to the video conference system causes the video conference system to provide the content item suggestion to each participant client device associated with the ongoing online meeting.

11. The non-transitory computer readable storage medium as recited in claim 8, wherein providing the content item suggestion to the video conference system causes the video conference system to provide the content item suggestion to a subset of participant client devices associated with the ongoing online meeting.

12. The non-transitory computer readable storage medium as recited in claim 8, further comprising instructions that cause the computer device to:

access ongoing transcription data for the ongoing online meeting;

analyzing the ongoing transcription data to determine a current topic being discussed; and providing the current topic to the video conference system to cause the video conference system to provide an indication of the current topic to each participant client device associated with the ongoing online meeting.

13. The non-transitory computer readable storage medium as recited in claim 8, further comprising instructions that cause the computer device to:

generating a meeting summary for the ongoing online meeting, the meeting summary comprising the reference to the content item from the content item suggestion; and providing the meeting summary to at least one participant client device associated with the ongoing online meeting.

14. The non-transitory computer readable storage medium as recited in claim 8, wherein the instructions further cause the computer device to:

access an agenda content item from the meeting data corresponding to the ongoing online meeting, the agenda content item comprising a plurality of agenda items;

identifying a planned time for each agenda item of the plurality of agenda items; and providing a time tracking indication to at least one participant client device associated with the ongoing online meeting based on determining whether the ongoing online meeting is on track to end on time based on the planned time for a remaining set of agenda items and a scheduled end time of the ongoing online meeting.

15. A system comprising:

at least one processor; and a non-transitory computer memory comprising instructions that, when executed by the at least one processor, cause the system to:

receive, from a video conference system and at a content management system, meeting data corresponding to an online meeting hosted by the video conference system;

generating relevance information indicating correlations between the meeting data and content items stored within the content management system for an account associated with the online meeting by processing, utilizing a trained machine-learning model, the meeting data together with text or metadata associated with the content items;

identify, by the content management system based on the relevance information, a content item previously stored within the content management system that is relevant to the online meeting;

generate a content item suggestion that includes a reference to the content item; and provide the content item suggestion to at least one participant client device associated with the online meeting hosted by the video conference system.

16. The system as recited in claim 15, wherein providing the content item suggestion to the at least one participant client device associated with the online meeting comprises causing the video conference system to provide the content item suggestion to the at least one participant client device.

17. The system as recited in claim 15, further comprising instructions that, when executed by the at least one processor, cause the system to:

receive audio data as part of the meeting data corresponding to the online meeting hosted by the video conference system;

process the audio data to generate a transcription for the online meeting; and analyze the transcription using the trained machine-learning model to identify the content item stored within the content management system.

18. The system as recited in claim 15, further comprising instructions that, when executed by the at least one processor, cause the system to:

access transcription text from the meeting data for the online meeting;

analyzing the transcription text to determine a current topic being discussed; and providing the current topic to the video conference system to cause the video conference system to provide an indication of the current topic to each participant client device associated with the online meeting.

19. The system as recited in claim 15, further comprising instructions that, when executed by the at least one processor, cause the system to generate, after a conclusion of the online meeting, a meeting summary based on analyzing the meeting data corresponding to the online meeting, wherein the meeting summary comprises the reference to the content item from the content item suggestion.

20. The system as recited in claim 15, further comprising instructions that, when executed by the at least one processor, cause the system to:

access an agenda content item corresponding to the online meeting, the agenda content item comprising a plurality of agenda items;

identify a planned time for each agenda item of the plurality of agenda items based on a scheduled start time and a scheduled end time for the online meeting; and provide, during the online meeting, a message to the at least one participant client device associated with the online meeting based on determining a remaining planned time for a remaining set of agenda items is greater than a remaining scheduled time based on the scheduled end time for the online meeting.

* * * * *